United States Patent
Polson et al.

(10) Patent No.: US 11,861,981 B2
(45) Date of Patent: Jan. 2, 2024

(54) EXPERIENCE-ADAPTIVE INTERACTION INTERFACE FOR UNCERTAIN MEASURABLE EVENTS ENGAGEMENT

(71) Applicant: DISH Network L.L.C., Englewood, CO (US)

(72) Inventors: Matthew Polson, Castle Rock, CO (US); Jesse Montgomery, Denver, CO (US); Shaun Ryan, Colorado Springs, CO (US); Robert Sadler, Denver, CO (US); Timothy Meyer, Denver, CO (US); Christopher Kuhrt, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/505,135

(22) Filed: Oct. 19, 2021

(65) Prior Publication Data
US 2023/0124722 A1     Apr. 20, 2023

(51) Int. Cl.
*G07F 17/32* (2006.01)
*H04N 21/472* (2011.01)
*H04N 21/2187* (2011.01)
*H04N 21/466* (2011.01)
*G06Q 50/34* (2012.01)
*G06F 40/186* (2020.01)

(52) U.S. Cl.
CPC ........ *G07F 17/3251* (2013.01); *G06F 40/186* (2020.01); *G06Q 50/34* (2013.01); *G07F 17/3288* (2013.01); *H04N 21/2187* (2013.01); *H04N 21/466* (2013.01); *H04N 21/472* (2013.01)

(58) Field of Classification Search
None
See application file for complete search history.

(56) References Cited

U.S. PATENT DOCUMENTS

| | | |
|---|---|---|
| 6,708,335 B1 | 3/2004 | Ozer et al. |
| 7,242,406 B2 | 7/2007 | Robotham et al. |
| 7,985,134 B2 | 7/2011 | Ellis |

(Continued)

FOREIGN PATENT DOCUMENTS

EP      3691286 A1      8/2020

*Primary Examiner* — Ronald Laneau
(74) *Attorney, Agent, or Firm* — KILPATRICK TOWNSEND & STOCKTON LLP

(57) ABSTRACT

Techniques are provided for experience-adaptive interaction with uncertain measurable events (UMEs), such as in a sports wagering context. A back-end wagering system of a television service provider system is disposed in a television network to provide subscribers with subscription content services for live event content and UME interaction services for viewing and placing wagers on live event content with a UME book provider. Embodiments can build data spaces at least of available live event content and wagerable UMEs being provided for the live event content. Embodiments can assign a wager experience score to a subscribers based on experience level with UME interactions, and can use the built data space and the wager experience score to generate an experience-tailored set of wager offers for the subscriber. The set of wager offers can then be presented to the subscriber in an experience-tailored UME interaction interface.

19 Claims, 7 Drawing Sheets

(56) References Cited

U.S. PATENT DOCUMENTS

| | | | |
|---|---|---|---|
| 8,046,798 | B1 | 10/2011 | Schlack et al. |
| 8,282,468 | B2 | 10/2012 | Huntley et al. |
| 8,694,396 | B1 | 4/2014 | Craner et al. |
| 9,015,737 | B2 | 4/2015 | Garza et al. |
| 9,288,539 | B2 * | 3/2016 | Johnson ............ H04N 7/17318 |
| 9,848,249 | B2 | 12/2017 | Freed et al. |
| 9,854,317 | B1 | 12/2017 | Abboa-Offei et al. |
| 10,880,351 | B1 | 12/2020 | Estus et al. |
| 2001/0037211 | A1 | 11/2001 | McNutt et al. |
| 2002/0054088 | A1 | 5/2002 | Tanskanen et al. |
| 2008/0064490 | A1 | 3/2008 | Ellis |
| 2008/0066111 | A1 | 3/2008 | Ellis et al. |
| 2011/0287825 | A1 | 11/2011 | Hoover |
| 2012/0231890 | A1 | 9/2012 | Junkin et al. |
| 2013/0203483 | A1 | 8/2013 | Joshi et al. |
| 2014/0068659 | A1 | 3/2014 | Vasilikakis et al. |
| 2015/0379816 | A1 | 12/2015 | Hayon |
| 2017/0103615 | A1 | 4/2017 | Theodosopoulos |
| 2018/0167656 | A1 | 6/2018 | Ortiz et al. |
| 2018/0304146 | A1 | 10/2018 | Dayal et al. |
| 2019/0158787 | A1 | 5/2019 | Pino, Jr. et al. |
| 2019/0238909 | A1 | 8/2019 | Graham et al. |
| 2020/0074181 | A1 | 3/2020 | Chang et al. |
| 2020/0252664 | A1 | 8/2020 | Weinraub |
| 2020/0334959 | A1 | 10/2020 | Nelson et al. |
| 2020/0357246 | A1 | 11/2020 | Nelson et al. |
| 2021/0056750 | A1 | 2/2021 | Rowley |
| 2021/0076099 | A1 | 3/2021 | Ganschow et al. |
| 2021/0118264 | A1 | 4/2021 | Nelson et al. |
| 2021/0168457 | A1 | 6/2021 | Taylor |
| 2021/0227275 | A1 | 7/2021 | Nonnenmacher et al. |
| 2021/0344991 | A1 | 11/2021 | Todd |
| 2022/0103905 | A1 * | 3/2022 | Montgomery ..... H04N 21/8133 |
| 2022/0157127 | A1 | 5/2022 | Tadepalli et al. |
| 2022/0377427 | A1 * | 11/2022 | Montgomery ..... H04N 21/4532 |

* cited by examiner

EXPERIENCE-ADAPTIVE INTERACTION INTERFACE FOR UNCERTAIN MEASURABLE EVENTS ENGAGEMENT

FIELD

Embodiments generally relate to communication networks, and, more particularly, to dynamic simplification of user interaction interfaces for uncertain measurable events based on experience level.

BACKGROUND

Sports wagering has become more popular as it has been legalized in a greater number of jurisdictions. A typical user may place a wager in order to have a greater rooting interest in a particular sporting event. Such a user may wish to place a wager and watch some or all of a broadcast of the sporting event. Recently, a number of online applications have increased accessibility to sports wagering across large groups of users with a large range of backgrounds and experience levels. Still, many users encounter frustrations with engaging in such wagering. One such frustration is that users may tend to view sporting events using one set of viewing environments and/or privileges, while using a separate set of viewing environments and/or privileges for accessing sports wagering applications. Another frustration is that users with different experience levels with regard to sports wagering tend to desire different types of access and information. For example, a novice bettor may be deterred by too many options and too much information, while an expert bettor may be frustrated by too few options and too little information.

SUMMARY

Embodiments relate to experience-adaptive interaction with uncertain measurable events (UMEs), such as in a sports wagering context. A back-end wagering system of a television service provider system is disposed in a television network to provide subscribers with subscription content services for live event content (e.g., live sports programming) and UME interaction services for viewing and placing wagers on live event content. Embodiments can build data spaces at least of available live event content and wagerable UMEs being provided for the live event content. Embodiments can assign a wager experience score to a subscribers based on experience level with UME interactions, and can use the built data space and the wager experience score to generate an experience-tailored set of wager offers for the subscriber. The set of wager offers can then be presented to the subscriber in an experience-tailored UME interaction interface.

According to one set of embodiments, a television service provider system is provided for experience-adaptive interaction with uncertain measurable events (UMEs). The system includes a subscriber wager processor and a non-transient processor-readable memory having instructions stored thereon which, when executed, cause the subscriber wager processor to perform steps. The steps include: determining live event content that is presentable to a subscriber in accordance with a content subscription between the subscriber and the television service provider; querying a UME book provider for a set of wagerable UMEs available for the live event content, the subscriber having a UME interaction subscription with the UME book provider; determining a wager experience score assigned to the subscriber by the television service provider; generating a set of wager offers to present to the subscriber based at least on the set of wagerable UMEs and the wager experience score; selecting a UME interaction interface template based on the wager experience score, the UME interaction interface template being one of a plurality of experience-adaptive UME interaction interfaces, each adapted for a respective one or more wager experience scores, and each associated with a respective set of wager offer templates adapted for the respective one or more wager experience scores; and outputting, to a television receiver of the subscriber, instructions to generate the UME interaction interface for display to the subscriber via a presentation device in accordance with the UME interaction interface template being populated with the set of wager offers based on the respective set of wager offer templates.

According to another set of embodiments, a method is provided for experience-adaptive interaction with uncertain measurable events (UMEs). The method includes: determining, by a back-end wagering system of a television service provider, live event content that is presentable to a subscriber in accordance with a content subscription between the subscriber and the television service provider; querying a UME book provider, by the back-end wagering system, for a set of wagerable UMEs available for the live event content, the subscriber having a UME interaction subscription with the UME book provider; determining, by the back-end wagering system, a wager experience score assigned to the subscriber by the television service provider; generating, by the back-end wagering system, a set of wager offers to present to the subscriber based at least on the set of wagerable UMEs and the wager experience score; selecting a UME interaction interface template by the back-end wagering system based on the wager experience score, the UME interaction interface template being one of a plurality of experience-adaptive UME interaction interfaces, each adapted for a respective one or more wager experience scores, and each associated with a respective set of wager offer templates adapted for the respective one or more wager experience scores; and outputting, by the back-end wagering system to a television receiver of the subscriber, instructions to generate the UME interaction interface for display to the subscriber via a presentation device in accordance with the UME interaction interface template being populated with the set of wager offers based on the respective set of wager offer templates.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

As sports wagering increases in popularity and legality, new virtual arenas are providing users with increased access to such wagering. Still, many users encounter frustrations with these avenues. Some such frustrations arise from a typical decoupling between access to sports content viewing and wagering service access. For example, a user may have a subscription to a sports wagering application that provides access to wagering services via mobile devices or computers (via the Internet), and the user may have a separate subscription to view live sporting events via televisions (via a television broadcast network). In such cases, a user may not have access to the same content in both environments. For example, a sports fan may desire to view a sporting event on a large-screen, high quality (e.g., high-resolution) television, but may have to interact with their wagering application via a separate screen of a separate device; or a sports bettor may desire to interact with their wagering application via their mobile device, but may not have permission on that device to access and view related live sporting events. Another frustration is that users with different experience levels with regard to sports wagering tend to desire different types of access and information. For example, a novice bettor may feel deterred when presented with too many options and too much information, while an expert bettor may feel frustrated when presented with too few options and too little information.

Embodiments detailed herein seek to provide subscriber-bettors with experience-adaptive user interfaces by which to interact and engage with uncertain measurable events (UMEs), such as in context of sports wagering. The interfaces can manifest a dynamically adaptive complexity level based on experience level of the subscriber-bettor, such as the subscriber-bettor's experience with the interface and/or with provided types of UME engagement (e.g., sports wagering). Some embodiments implement such dynamic complexity-adaptive interfaces via subscriber television receivers that provide access both to viewable content via a television service provider system and to UME interaction services via the same television service provider as securely linked with a UME booking system.

Figure 1:
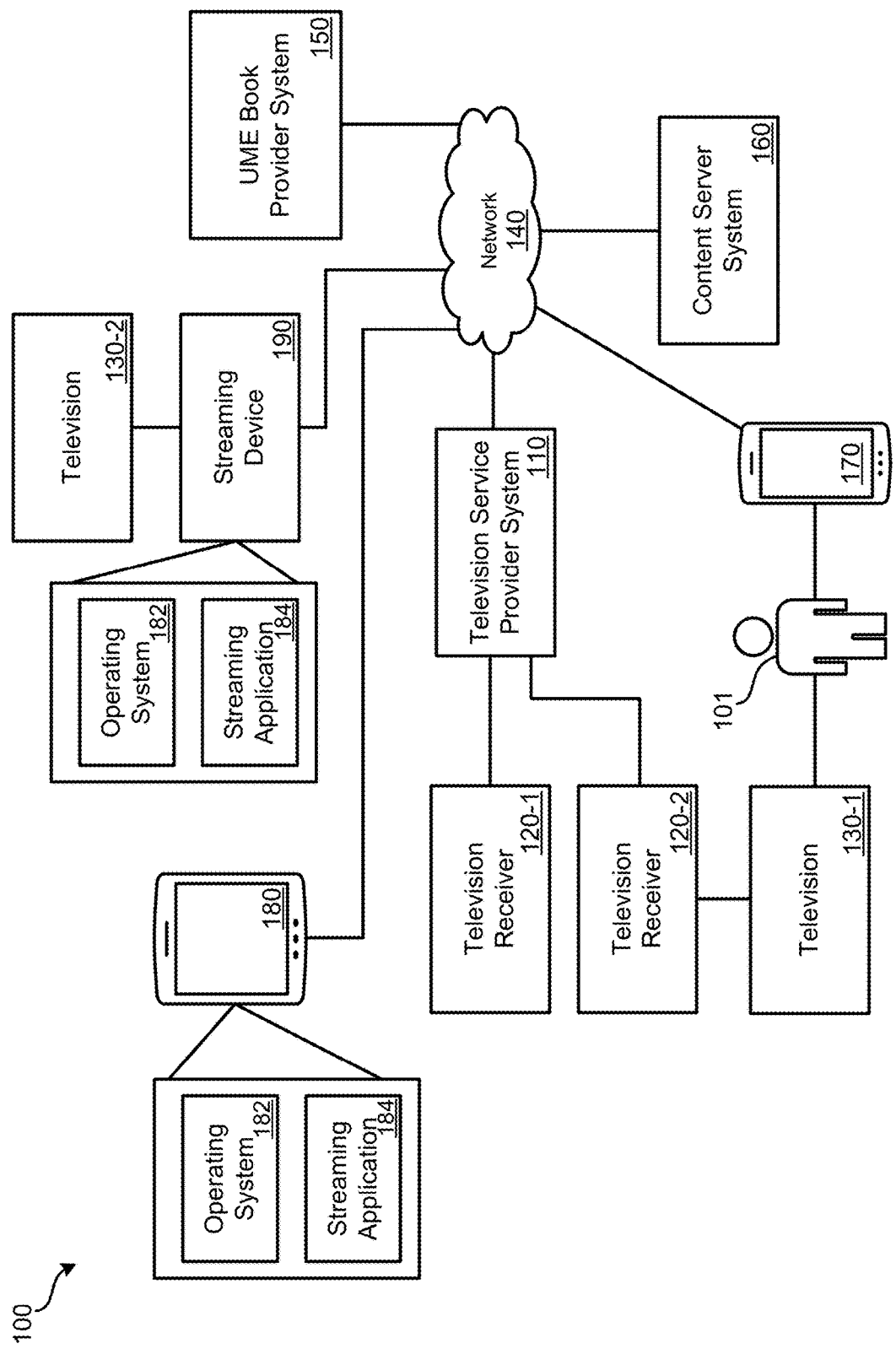
FIG. 1 illustrates an embodiment of a system for providing content viewing services and uncertain measurable event (UME) interaction services, according to various embodiments described herein.

FIG. 1 illustrates an embodiment of a system 100 for providing content viewing services and uncertain measurable event (UME) interaction services, according to various embodiments described herein. System 100 can include a television service provider system 110, a UME book provider system 150, a content server system 160, and subscriber systems, all in communication over one or more networks 140. The subscriber systems can include one or more television receivers 120 in communication with one or more presentation devices, such as televisions 130, mobile devices 170, computerized devices 180, streaming devices 190, etc. The presentation devices are configured to provide content viewing services and UME interaction services to subscribers 101 (also generally referred to as "subscriber-bettors," "television viewers," "users," or the like). It can be assumed herein that a subscriber 101 is a subscriber to both to content presentation services (permitting the subscribers 101 to view content having associated UMEs via the one or more presentation devices) and to UME interaction services (permitting the subscribers 101 to via and engage in UME interactions). For example, the subscriber 101 has an active subscription with a television service provider associated with the television service provider system 110 and with a UME book provider associated with the UME book provider system 150.

Television service provider system 110 may broadcast live television programming to television receivers 120 and/or transmit live television programming as a streaming service via the Internet to computerized devices and streaming devices. "Live" television programming refers to television programming that is transmitted substantially contemporaneously with the event occurring. Live television programming may include a delay of up to several minutes. For instance, a sporting event that is broadcast with a delay of up to a few minutes, such as to edit out offensive audio, would qualify as live television programming. Such live television programming may be received from various content providers, then relayed by television service provider system 110 to television receivers 120 via a television distribution network and/or as an over-the-top (OTT) service to computerized and/or streaming devices via the Internet (or some other public network). Streams of many television channels may be broadcast live via various types of television programming distribution networks, such as a satellite-based network, a cable-based network, an IP-based network, or an OTT television distribution network. As such, though described as live television content, the content does not have to be broadcast by a conventional television network, or ever be displayed on a television. Rather, as used herein, any content that can be associated with the types of wagerable UMEs described herein can be considered as live television content. In addition to streaming live television channels, television service provider system 110 may transmit on-demand content, applications for execution, electronic programming guide (EPG) data, metadata, and other services ancillary to live television programming. As described herein, embodiments of the television receiver 120 further provide access to UME interactions jointly provided by the UME book provider system 150 and the television service provider system 110. Further detail regarding a possible embodiment of television service provider system 110 is provided in relation to FIG. 2.

While two television receivers 120 are presented, this number of television receivers is merely for illustration—many more television receivers may receive live television programming from television service provider system 110 in other embodiments. A television receiver, such as television receiver 120-2, may be integrated as part of a television or other form of display device, or may be a separate device, such as a set top box (STB), that receives data from television service provider system 110 and outputs the data for presentation, such as to television 130-1. The data received by a television receiver 120 may be scrambled or encrypted, and the television receiver 120 may only have authorization to decode/descramble particular television channels and/or particular groups of television channels based on a rights scheme assigned to the user account mapped to the television receiver 120.

In some embodiments, the television receiver 120 is implemented as part of a computerized device (e.g., computerized device 180), a streaming device (e.g., streaming device 190), or in any other suitable system. For example, computerized device 180 or streaming device 190 can be a laptop computer, desktop computer, tablet computer, gaming console, smart television, smartphone, smart headphones, wearable device, router, and/or any other suitable device that includes components for receiving live television content, such as a live sporting event. In some implementations, the components are for receiving live television broadcasts over a conventional television network, such as tuners, antennas, and supporting hardware and/or software components for receiving content over cable, satellite, and/or other television networks. In other implementations, the components are for receiving live television programming as distributed over one or more other types of networks 140, such as OTT content delivered over the Internet. In some implementations, the computerized device 180 or streaming device 190 executes an operating system 182 and has a streaming application 184 installed thereon, which permits the subscriber 101 to access live streaming television programming from the television service provider system 110 via network 140.

In some implementations, the computerized device 180 includes an integrated presentation device (e.g., a display screen). In some implementations, the computerized device 180 includes a streaming device 190 integrated therein. In some implementations, the streaming device 190 can be coupled with a presentation device. In some implementations, the streaming device 190 is a computerized device that does not directly output video (e.g., or does not include integrated display components). For instance, streaming device 190 may be plugged into a port of television 130-2, which can be used to output video and/or audio (e.g., thereby acting substantially as a set-top box in relation to embodiments described herein). For example, The subscriber 101 may be permitted to view any television channel via computerized device 180 or streaming device 190 for which an associated subscriber 101 account is presently authorized, such as due to a subscription, or other grant of rights. The same computerized device 180 or streaming device 190 may also be used to interact with the UME book provider system 150 via one or more experience-adaptive UME interaction interfaces, as described herein. The output of the video channel and the UME interaction interfaces can be displayed on an integrated display (e.g., of a computerized device 180), on a connected display (e.g., of a streaming device 190), and/or in any other suitable manner.

As described herein, embodiments involve the television service provider system 110 providing subscribers 101 with access both to live event content from one or more content server systems 160 and to UME interaction services from one or more UME book provider systems 150. Television service provider system 110 may use a dedicated television-distribution network to communicate with television receivers 120 (e.g., the network 140 may be the dedicated television-distribution network, or the dedicated television-distribution network may be one of the networks 140). For example, the television receivers 120 communicate with the television service provider system 110 via the dedicated television-distribution network, and the television service provider system 110 communicates (e.g., as an intermediary) with the content server systems 160 and UME book provider systems 150. Additionally or alternatively, multiple networks 140 may be used to effect communications between some or all of the television receivers 120, the television service provider system 110, the content server system 160, and the UME book provider system 150. The networks 140 may include one or more public and/or private networks, which can include the Internet. In some such embodiments, regardless of the numbers and/or types of networks 140 being used for communications, the television service provider system 110 handles interactions between the television receivers 120 and both content server systems 160 and UME book provider systems 150, at least for purposes of implementing features described herein.

UME book provider system 150 may be operated by an entity that is distinct from the entity operating television service provider system 110. The entity operating the UME book provider system 150, generally called the "UME book," may host various wagers and may be used to set the odds, and or other relevant wager parameters, in relation to UMEs. As the term suggests, UMEs generally include any occurrences that have an uncertain, but measurable outcome in context of live event content in some relevant timeframe. For example, many features and embodiments are described herein with reference to sporting events and sports wagering. In sporting event contexts, the UMEs can include any measurable outcome relating to any one or more competitors, competitions, etc. for which there is no certain measurement of the outcome at an earlier point in time and for which there is a certain measurement of the outcome at a later point in time; and the live event content can include any live sports contests or other content that includes one or more of the UMEs. For example, as described herein, UMEs for sporting events can include a final score of a game, a winner of a tournament, whether a particular player will be part of a line-up, the outcome of a coin toss, or any of a wide variety of events that begin as uncertain and later become certain. In such contexts, the entity operating the UME book provider system 150 can be referred to as a "sportsbook," and the sportsbook can generally choose a subset of all the possible UMEs as "wagerable UMEs."

As used herein, the wagerable UMEs for a UME book provider would include all UMEs on which a subscriber to UME interaction services could potentially place a wager through their account with the UME book provider. Wagerable UMEs typically represent only a subset of UMEs for various reasons, including practical limits on the numbers and types of UMEs that a UME book provider desires or is able to support, restrictions based on legal or regulatory frameworks, etc. In some cases, supported wagerable UMEs may change over time, and/or based on a subscriber's physical location, age, citizenship, financial resources, experience, etc. For example, a subscriber who is physically located in a jurisdiction that permits sports gaming and who is of at least a minimum legal age may be permitted to place qualifying types of wagers on qualifying sporting events via the UME book provider system 150. Some embodiments can support other types of UMEs, including outside of the sports wagering context, depending on legality and/or other practical limitations. For example, a UME book provider may support wagerable UMEs on live event content relating to outcomes of political races, reality television shows, financial markets, or any other suitable contexts.

Various types of UMEs can be provided to support various types of wagers. For example, as described below, sports wagering includes many different types of wagers, such as moneyline wagers, point spread wagers, parlay wagers, over/under wagers, proposition wagers, futures wagers, and others. As such, in some cases, a single live event may be associated with multiple wagerable UMEs. For example, for a single football game, a UME book provider may offer many different types of wagerable UMEs, including wagering on the winner of the game, final score totals, scores at the quarter and/or half, whether a team covered a predetermined spread, particular player stats, particular team stats, numbers of particular occurrences, etc. In other cases, a single wagerable UME may be associated with multiple live events, or combinations of UMEs. For example, a single wagerable UME can be based on the final score total over a tournament, season, combination of games, etc.

Television service provider system 110 may communicate with UME book provider system 150 via network 140. UME book provider system 150 may provide the television service provider system 110 with wager information, including indications of various wagerable UMEs and associated wager parameters. Television service provider system 110 may relay such wager information to television receivers 120 (e.g., via experience-adaptive UME interaction interfaces, as described herein). UME book provider system 150 may also transmit indications of wagers placed by particular subscribers 101 (and/or others) to television service provider system 110. Television service provider system 110 may relay wagers placed by the particular subscribers 101 and/or others to the television viewer's television receiver 120 for presentation via one or more presentation devices. UME book provider system 150 may query television service provider system 110 to determine whether a user has access to a particular television channel or for a listing of all television channels to which the user has access, or the UME book provider system 150 may query television service provider system 110 to determine whether a user has any means of access to a particular live event (associated with wagerable UMEs) via the television service provider system 110. Alternatively, an indication of a wager may be sent to television service provider system 110 by UME book provider system 150. Television service provider system 110 may determine live event content associated with the wager and determine whether a subscriber 101 has access. An indication of whether the subscriber 101 has access to the live event content on a television channel (or other type of channel) may be provided back to UME book provider system 150.

Content server system 160 may provide information ancillary to television service provider system 110 and UME book provider system 150. For example, content server system 160 may provide details on live event content, such as descriptors of sporting events, including associated television channel, date, scheduled start time, scheduled end time, details of the participating teams and players (e.g., team records, player-specific statistics), location of the sporting event, and/or other details of the sporting event.

A subscriber 101 may be using television 130-1 to view a sporting event. The sporting event may be received as live television programming by television receiver 120-2 from television service provider system 110. Subscriber 101 may use a remote control to interact with television receiver 120-2. Subscriber 101 has an option to view a sports gaming interface, which can include, or provide access to, one or more experience-adaptive UME interaction interfaces. In some embodiments, some other form of electronic device may be used, such as a computerized mobile device or smartphone. The sports gaming interface can be output concurrently with television programming, such as with the live event content being viewed by subscriber 101. The sports gaming interface may function as an application that is installed on television receiver 120-2. Television service provider system 110 may have previously transmitted data to all of television receivers 120 or in response to a request for a particular television receiver 120 initiated by a user, such as by subscriber 101. A similar interface may be presented via streaming applications 184, or the like.

Figure 2:
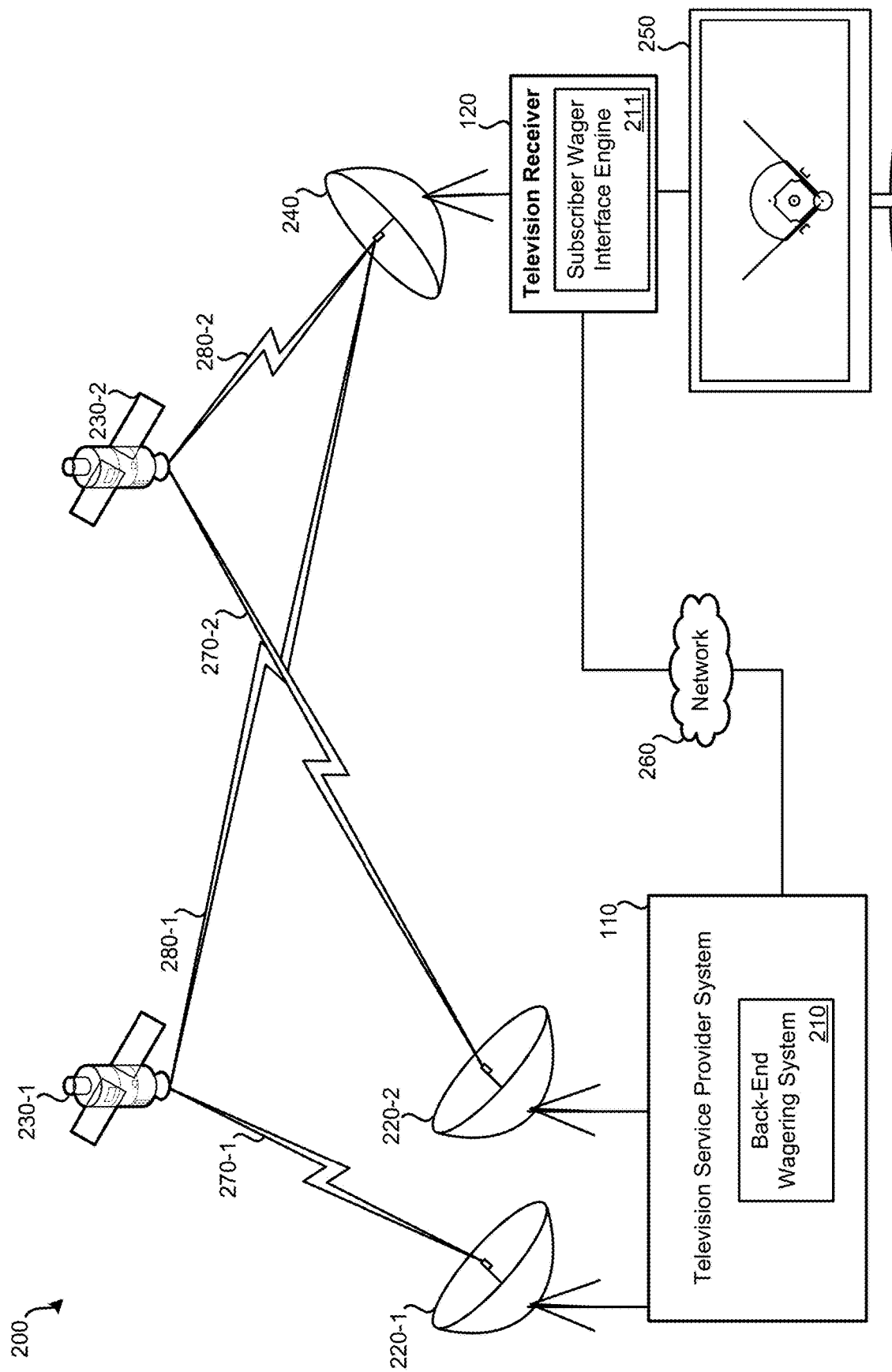
FIG. 2 illustrates an embodiment of a satellite-based television distribution system.

FIG. 2 illustrates an embodiment of a satellite-based television distribution system 200. Satellite-based television distribution system 200 may include: television service provider system 110, satellite transmitter equipment 220, satellites 230, satellite antenna 240, television receiver 120, and presentation device 250. Alternate embodiments of satellite-based television distribution system 200 may include fewer or greater numbers of components. While only one satellite antenna 240, television receiver 120, and presentation device 250 (which can collectively be referred to as "user equipment") are illustrated, it should be understood that multiple (e.g., tens, thousands, millions) instances of user equipment may receive television signals from television service provider system 110 via satellites 230. In the example of FIG. 2, while television service provider system 110 uses satellites to communicate with television receiver 120, other forms of television programming distribution networks can be used in other embodiments. Further, as described with reference to FIG. 1, different implementation of television receivers 120 and presentation devices 250 can be used. For example, while FIG. 2 shows the presentation device 250 as a television with a separate television receiver 120 (e.g., as a set-top box, or the like), the presentation device 250 and/or television receiver 120 could be implemented using one or more computerized devices 180, streaming devices 190, etc.

Television service provider system 110 and satellite transmitter equipment 220 may be operated by a television service provider. A television service provider may distribute television channels that distribute live television programming, on-demand programming, pay-per-view (PPV) programming, programming information, data, firmware updates, and/or other content/services to users. Television service provider system 110 may receive feeds of one or more live television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 220 (220-1, 220-2) may be used to transmit a feed of one or more television channels from television service provider system 110 to one or more satellites 230. While a single television service provider system 110 and satellite transmitter equipment 220 are illustrated as part of satellite-based television distribution system 200, it should be understood that multiple instances of transmitter equipment may be used, possibly scattered geographically, to communicate with satellites 230. Such multiple instances of satellite transmitting equipment may communicate with the same or with different satellites.

Different television channels may be transmitted to satellites 230 from different instances of transmitting equipment. For instance, a different satellite antenna of satellite transmitter equipment 220 may be used for communication with satellites in different orbital slots.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels transmitted as packetized data. For example, a single transponder stream may be a serial digital packet stream containing multiple television channels. Therefore, packets for multiple television channels may be interspersed.

Multiple satellites 230 may be used to relay television channels from television service provider system 110 to satellite antenna 240. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 240 may be a piece of user equipment that is used to receive transponder streams from one or more satellites, such as satellites 230. Satellite antenna 240 may be provided to a subscriber for use on a subscription basis to receive television channels provided by the television service provider system 110, satellite transmitter equipment 220, and/or satellites 230. Satellite antenna 240, which may include one or more low noise blocks (LNBs), may be configured to receive transponder streams from multiple satellites and/or multiple transponders of the same satellite. Satellite antenna 240 may be configured to receive television channels via transponder streams on multiple frequencies. Based on the characteristics of television receiver 120 and/or satellite antenna 240, it may only be possible to capture transponder streams from a limited number of transponders concurrently. For example, a tuner of television receiver 120 may only be able to tune to a single transponder stream from a transponder of a single satellite at a given time. The tuner can then be re-tuned to another transponder of the same or a different satellite. A television receiver 120 having multiple tuners may allow for multiple transponder streams to be received at the same time.

In communication with satellite antenna 240 may be one or more television receivers 120. Television receivers 120 may be configured to decode signals received from satellites 230 via satellite antenna 240 for output and presentation via a display device, such as presentation device 250. A television receiver 120 may be incorporated as part of the presentation device 250, or may be part of a separate device, such as a set-top box (STB). Television receiver 120 may decode signals received via satellite antenna 240 and provide an output to presentation device 250. Presentation device 250 may be used to present video and/or audio decoded and output by television receiver 120. Television receiver 120 may also output a display of one or more interfaces to presentation device 250, such as an electronic programming guide (EPG), and one or more experience-adaptive UME interaction interfaces.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels. Transponder stream 280-1 represents a transponder stream signal between satellite 230-1 and satellite antenna 240. Transponder stream 280-2 represents a transponder stream signal between satellite 230-2 and satellite antenna 240. Each of transponder streams 280 may contain one or more different television channels, which may be at least partially scrambled. For example, transponder stream 280-1 may be a first transponder stream containing a first group of television channels, while transponder stream 280-2 may be a second transponder stream containing a different group of television channels. When a television channel is received as part of a transponder stream and is decoded and output to presentation device 250 (rather than first storing the television channel to a storage medium as part of DVR functionality, then later outputting the television channel from the storage medium), the television channel may be considered to be viewed "live." FIG. 2 illustrates transponder stream 280-1 and transponder stream 280-2 being received by satellite antenna 240 and distributed to television receiver 120. For a first group of television channels, satellite antenna 240 may receive transponder stream 280-1, and for a second group of channels, transponder stream 280-2 may be received. Television receiver 120-2 may decode the received transponder streams. As such, depending on which television channels are desired to be presented or stored, various transponder streams from various satellites may be received, descrambled, and decoded by television receiver 120-2.

Network 260 represents one or more secondary communication channels between television service provider system 110 and television receiver 120. For example, the network 140 of FIG. 1 can include both the broadcast television network of FIG. 2 (e.g., including the various satellite network components) and the one or more alternative communication channels (e.g., the Internet) represented by network 260 of FIG. 2. In many instances, television receiver 120 may be disconnected from network 260 (for reasons such as because television receiver 120 is not configured to connect to network 260, or a subscriber does not desire to, or cannot connect their television receiver 120 to network 260). Via such a secondary communication channel, bidirectional exchange of data may occur. As such, data may be transmitted to television service provider system 110 from television receiver 120 via network 260. Data may also be transmitted from television service provider system 110 to television receiver 120 via network 260. Network 260 may be, or may include, the Internet. While audio and video services may be provided to television receiver 120 via satellites 230, feedback from television receiver 120 to television service provider system 110 may be transmitted via network 260. For example, embodiments described herein involve various subscriber interactions with experience-adaptive UME interaction interfaces, including using such interfaces to view, navigate, select, and/or otherwise engage with wager offers displayed in such interfaces to support placing of wagers by subscribers.

As illustrated, features relating to UME engagement and experience-adaptive UME interaction interfaces to facilitate such engagement can involve communications by and between a back-end wagering system 210 of the television service provider system 110 and a subscriber wager interface engine 211 implemented by the television receiver 120. Such communications can be via the satellites 230 and/or via network(s) 260 (one or more networks other than the satellite network, and/or other primary television broadcast network). In some embodiments, live event content is communicated via satellites 230, while UME interaction services are communicated via network(s) 260. In other embodiments, both live event content and UME interaction services are provided via satellites 230 (e.g., to enhance broadband connectivity, to maintain availability even without Internet connectivity, and/or for other reasons). In other embodiments, both live event content and UME interaction services are provided via network(s) 260 (e.g., for reduced latency, increased synchronization, and/or other reasons). In other embodiments, both live event content and UME interaction services are made available over both network(s) 260 and satellites 230 (e.g., for redundancy, and/or other reasons). Though not explicitly shown, the back-end wagering system 210 is also in communication with the UME book provider system 150, such as described with reference to FIG. 1. Such communications between the back-end wagering system 210 and the UME book provider system 150 can be implemented via the satellites 230 and/or network(s) 260.

Figure 3:
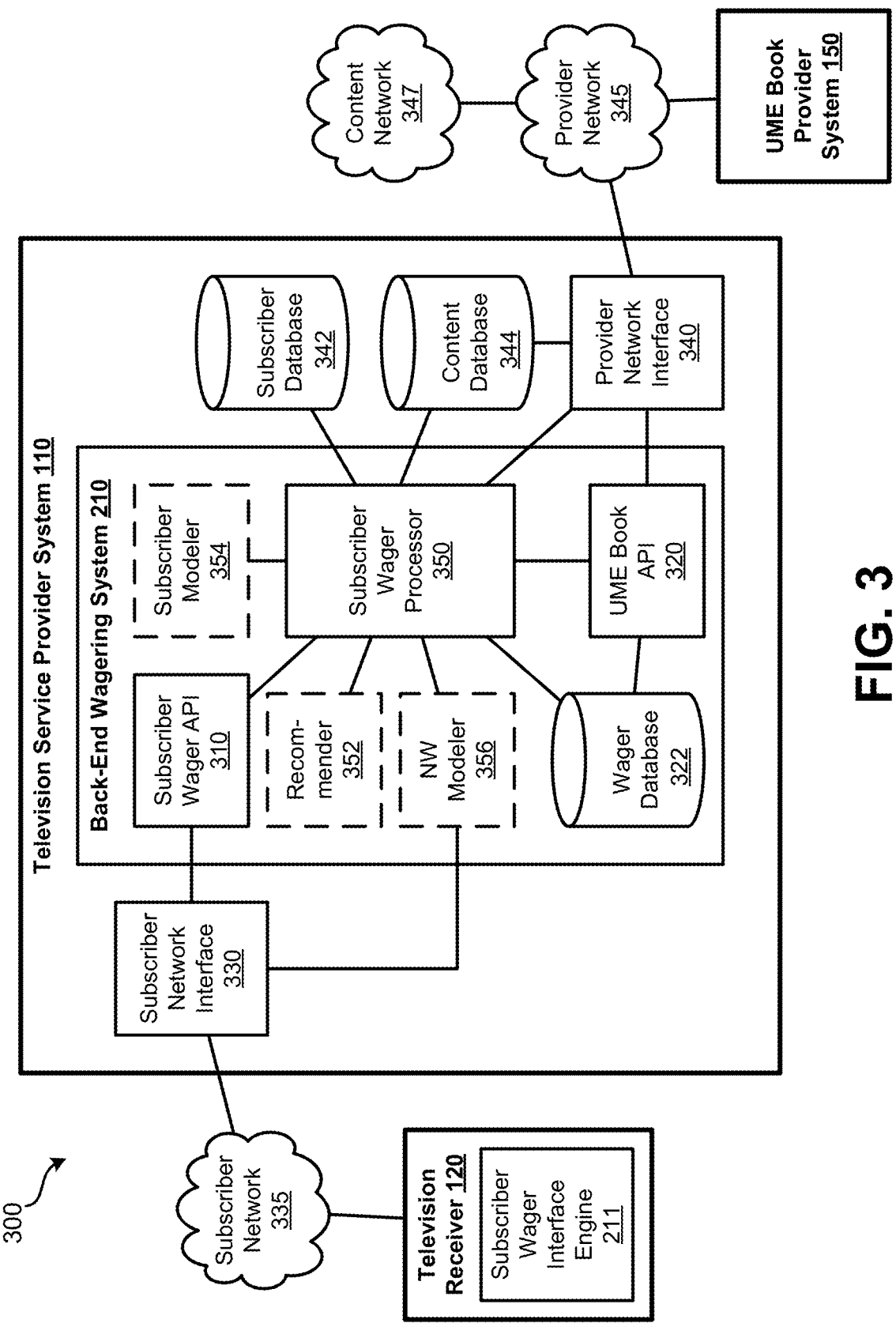
FIG. 3 shows a television service provider system with an illustrative implementation of a back-end wagering system in context of a television receiver and a UME book provider system, according to various embodiments described herein.

FIG. 3 shows a television service provider system 110 with an illustrative implementation of a back-end wagering system 210 in context of a television receiver 120 and a UME book provider system 150, according to various embodiments described herein. As illustrated, the television service provider system 110 can include at least a subscriber network interface 330 and a provider network interface 340. The subscriber network interface 330 can facilitate communications between the television service provider system 110 and television receivers 120 of subscribers 101 via one or more subscriber networks 335; and the provider network interface 340 can facilitate communications between the television service provider system 110 and content networks 347, at least one UME book provider system 150, and/or other entities via one or more provider networks 345.

Though only a single television receiver 120 is shown for the sake of simplicity, a typical deployment can have large numbers of subscribers 101 with large numbers of associated television receivers 120, some or all being in communication with the television service provider system 110. For example, some television service providers deliver services via millions of television receivers 120 via the television service provider system 110. Each of some or all of the television receivers 120 implement a subscriber wager interface engine 211, as described herein. Further, though only a single UME book provider system 150 is shown, some embodiments of the television service provider system 110 can be configured to provide UME interaction services for multiple UME book providers, and can be in communication with multiple UME book provider systems 150, accordingly. The television service provider system 110 is illustrated as implementing the back-end wagering system 210. In some embodiments, the television service provider system 110 implements multiple instances of the back-end wagering system 210. For example, each instance of the back-end wagering system 210 services a respective portion of television receivers 120.

In some embodiments, the back-end wagering system 210 serves as an intermediary between subscribers 101 and the UME book provider system 150. In some such embodiments, all subscriber 101 interactions with the UME book provider system 150 are handled through the back-end wagering system 210. For example, subscribers 101 experience all UME interactions by interacting with the television receiver 120 (e.g., via a remote control or other interface device) and/or by interacting with one or more consumer premises devices (e.g., presentation devices 250) in communication with the television receiver 120. In other embodiments, subscribers 101 can access UME interaction services of the UME book provider via the back-end wagering system 210 and/or directly via the UME book provider system 150. For example, some UME interaction services are provided by the UME book provider system 150 via an application, website, etc., and other UME interaction services are provided via the back-end wagering system 210.

It is generally assumed herein that subscribers 101 are subscribers both to content services via the television service provider and to UME interaction services via the UME book provider. In some implementations, the television service provider and the UME book provider are separate entities with separate subscriber account handling, such that subscribers 101 have a first subscription with the television service provider and a second subscription with the UME book provider. Suppose a subscriber 101 places a wager on a live sporting event. The television service provider may handle authorization, rights, delivery, payment, etc. for the content services by which the subscriber 101 can watch the live sporting event via the television network; and the UME book provider may handle authorization, booking, payment, etc. for the UME interaction services by which the subscriber 101 can place the wager. In other implementations, the television service provider and the UME book provider have a mutual agreement to provide a subscription service that includes both the subscription to content services from the television service provider and the subscription to UME interaction services with the UME book provider. As one example, the television service provider interfaces with the subscriber 101 on a front-end to handle authorization, rights, delivery, payment, etc. for both the content services and the UME interaction services; and the television service provider also interfaces with the UME book provider on a back-end to handle authorization, booking, payment, etc. for the UME interaction services on behalf of the subscriber 101.

As illustrated, the back-end wagering system 210 can include a subscriber wager processor 350. Execution of various features of the subscriber wager processor 350 involve coordination with other components of the back-end wagering system 210. As illustrated, embodiments of the back-end wagering system 210 can include some or all of a subscriber wager application programming interface (API) 310, a UME book API 320, a recommender 352, a subscriber modeler 354, and a network modeler 356. In some embodiments, the recommender 352, subscriber modeler 354, and/or network modeler 356 are implemented by the subscriber wager processor 350. In other embodiments, the recommender 352, subscriber modeler 354, and/or network modeler 356 are implemented by one or more processors and/or computational environments separate from the subscriber wager processor 350.

Embodiments can also include one or more databases, such as a wager database 322, a subscriber database 342, and/or a content database 344. In the illustrated implementation, the wager database 322 is shown as part of the back-end wagering system 210, and the subscriber database 342 and the content database 344 are shown as part of the television service provider system 110 outside the back-end wagering system 210 (i.e., accessible by the back-end wagering system 210). In other implementations, all the databases are part of the back-end wagering system 210, or all the databases are external to the back-end wagering system 210. The term "database" is not intended to be restricted to any particular storage technology, data format, etc. For example, each of the wager database 322, subscriber database 342, and/or content database 344 can be stored in any suitable data format in any suitable non-transient, computer readable data storage, such as in relational databases in cloud data storage systems.

Embodiments of the subscriber wager API 310 handle data communications between the subscriber wager processor 350 and the subscriber wager interface engine 211. Embodiments of the UME book API 320 handle data communications between the subscriber wager processor 350 and the UME book provider system 150. For example, the subscriber wager processor 350 is configured to expect certain types of inputs and to generate certain types of outputs, and the subscriber wager API 310 and the UME book API 320 operate to translate those inputs and/or outputs for use by subscriber wager interface engine 211 and the UME book provider system 150, respectively.

Embodiments of the subscriber wager processor 350 are configured generally to enhance subscriber 101 UME interactions by seeking to determine, based at least on a subscriber's experience, which wager offers are most appropriate to present to the subscriber 101 and which UME interaction interface is most appropriate to use for such presentation. Embodiments of the subscriber wager processor 350 may include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof.

As used herein, "wager offers" generally refer to offers generated based on corresponding wagerable UMEs for presentation to subscribers 101 via the subscriber wager interface engine 211. Each such wager offer is generated in a manner that provides for one or more interactions by a subscriber 101, including at least accepting the wager offer in a manner that results in the subscriber placing a corresponding wager with the UME book provider system 150 (via the television service provider system 110). A particular wager offer can indicate corresponding wager descriptors (e.g., describing the UME on which the wager would be placed if accepted, present popularity of the wager offer with other subscribers, etc.), static and/or dynamic wager parameters (e.g., odds, point spread, payout amounts, etc.), expiration time for the wager offer, related subscriber information (e.g., whether this is similar to other previous or current wagers placed), etc. In some cases, the wager offer also includes a wager amount, such that acceptance of the wager offer results in placement of a wager for that amount. In other cases, the wager offer includes one or more interactive controls, such as provided by the subscriber wager interface engine 211. For example, the subscriber wager interface engine 211 can provide means for the subscriber 101 to enter a wager amount, tease odds or spreads, invite other subscribers 101 to the wager offer, combine wager offers into parlays, suggest wager offers, etc. Different experience-adaptive UME interaction interface levels (e.g., different UME interaction interface templates, as described below) can be configured to support different numbers and/or types of such additional interaction controls. Some embodiments of the experience-adaptive UME interaction interfaces include interface controls that provide access to additional information relating to provision of the wager offers, such as explanations about the wager offer (e.g., meanings of wager terms, how to compute payouts, why that wager offer is being generated for that subscriber 101 at that time), general coaching information about wager types and related subjects, and/or any other suitable information.

Determining which wager offers to present to a subscriber 101 can involve consideration of at least: what live event content is presentable to the subscriber 101 (e.g., from content networks 347 via one or more provider networks 345) in accordance with a content subscription between the subscriber 101 and the television service provider; which wagerable UMEs are being offered by the UME book provider for that live event content in accordance with a UME interaction subscription between the subscriber 101 and the UME book provider; and what is the subscriber's 101 experience level with such wager offers and/or with the subscriber wager interface engine 211. Determining what live event content is presentable to the subscriber 101 can be implemented using various techniques. In some implementations, this determination is based on what the subscriber 101 is currently viewing. For example, a subscriber 101 is presently viewing a sporting event for "Team A versus Team B" on Sports Network. The subscriber wager processor 350 can determine that subscriber 101 is viewing Sports Network Based on channel selection information received from the subscriber's 101 television receiver 120, and the subscriber wager processor 350 can further determine that "Team A versus Team B" is currently playing on Sports Network based on information in the content database 344 (e.g., programming schedules). In such an implementation, for purposes of generating wager offers, the "live event content" can be considered as "Team A versus Team B," and only wagerable UMEs relating to that live content event will be considered.

In other implementations, determining what live event content is presentable to the subscriber 101 involves determining to which television channels (or other content channels) the subscriber 101 has access based on rights associated with the subscriber's content subscription. In some such implementations, the subscriber wager processor 350 queries the subscriber database 342 and the content database 344 to determine which content channels are available as part of the subscriber's content subscription and which live event content is scheduled for distribution via those content channels (e.g., in a particular timeframe beginning in and/or extending into the future). Determination of such available live event content can be impacted by additional factors, such as whether particular content is available in a physical location associated with the content subscription (e.g., a physical location of the television receiver 120), whether particular content is available for an additional fee (e.g., pay per view, or other on demand content), etc.

In other implementations, determining what live event content is presentable to the subscriber 101 can involve determining whether to grant (or offer to grant) to the subscriber 101 temporary rights to view particular live event content. In some cases, temporary rights may be granted for purposes of a promotion or reward being offered by the television service provider (e.g., to encourage the subscriber 101 to upgrade their content subscription). In other cases, temporary rights may be granted for purposes of a promotion or reward being offered by the UME book provider (e.g., the television service provider can grant a subscriber 101 rights to otherwise unauthorized live event content to promote or permit certain engagement with the UME interaction services at the behest of the UME book provider). Some techniques relating to granting of temporary rights are described in U.S. patent application Ser. No. 17/362,933, filed Jun. 29, 2021, titled "Temporary Television Rights Scheme Grant Based on Uncertain Measurable Events," which is hereby incorporated by reference in its entirety.

In other implementations, determining what live event content is presentable to the subscriber 101 can involve determining live event content being presented to a live event viewing group associated with the subscriber 101. For example, a live event viewing group can allow grouped subscribers 101 to view the same live event through the television service provider while viewing information about other users (e.g., subscribers, or otherwise) in the group, including other users' wager information placed through the UME book provider system 150. Such a live event viewing group can indicate to the subscriber wager processor 350 which live event content may be particularly relevant for purposes of wager offer generation. In some implementations, membership in such a live event viewing group can be a factor in determining whether to grant temporary viewing rights to the content. Some techniques relating to such live event viewing groups are described in U.S. patent application Ser. No. 17/327,145, filed May 21, 2021, titled "Group Televised Content Viewing Interactions," which is hereby incorporated by reference in its entirety.

Determining which wagerable UMEs are being offered by the UME book provider for the live event content can be implemented using various techniques. In some embodiments, the subscriber wager processor 350 first determines the live event content (e.g., according to one of the techniques described above), and subsequently determines wagerable UMEs that are available for that live event content. For example, embodiments of the subscriber wager processor 350 query the UME book provider system 150 via the UME book API 320 for all wagerable UMEs available for a particular set of live event content determined to be available to the subscriber 101. In other embodiments, the subscriber wager processor 350 first determines which wagerable UMEs are being offered by the UME book provider system 150, and subsequently determines which are associated with live event content to which the subscriber 101 has access (or to which the subscriber should be granted temporary access). In some such embodiments, the subscriber wager processor 350 periodically (e.g., once per each predetermined time interval, and/or according to a predetermined schedule, etc.) queries the UME book provider system 150 via the UME book API 320 for all wagerable UMEs available for all live event content, all wagerable UMEs available for all live event content available to the subscriber 101, all wagerable UMEs available for all live event content available from the television service provider (e.g., potentially available to any of its subscribers 101), or the like. In other such embodiments, the UME book provider system 150 periodically pushes a list of wagerable UMEs to the subscriber wager processor 350 via the UME book API 320.

The UME book provider can support many different types of wagers for many different types of wagerable UMEs. For each wagerable UME, the UME book provider can associate a set of wager descriptors, and a set of wager parameters. The wager descriptors can include any descriptive information about the wagerable UME, such as a type of wager represented by the wagerable UME, subjects of the wager (e.g., identifiers of the particular competition, team, player, occurrence, etc.) to which the wagerable UME applies, etc. The wager parameters can include relevant transactional parameters used ultimately to determine whether a wager was won or lost, the associated payout, etc. For example, the wager parameters can include odds, point spreads, commissions, etc. Depending on the type of wagerable UME (or type of subscriber 101 interaction with the wagerable UME), certain types of information may be considered a wager descriptor or a wager parameter. For example, for some wagerable UMEs, the USE book provider can associate a number, list, or other description of some or all other subscribers 101 that have placed a wager on the same wagerable UME. If information on others who have placed such a wager would be used, for example, to help the television service provider determine whether to recommend an associated wager to a particular subscriber 101, to recommend an live event viewing group to a subscriber 101, or the like, such information may be considered as a wager descriptor. If, however, the wagerable UMEs is associated with a form of wager having odds that change depending on how many others have placed such a wager, or such information otherwise impacts the terms of the wager itself, the information may be considered as wager parameters.

Such wager descriptors and wager parameters can be associated with the wagerable UMEs in any suitable manner. In some implementations, each wagerable UME is stored by the UME book provider system 150 as structured data in a relational database, data warehouse, or the like. In some such implementations, each wagerable UME is stored with structural associations (e.g., pointers) to its related descriptors and/or parameters, which can be independently stored. In other such implementations, each wagerable UME is stored as a data object having its descriptors and/or parameters stored as metadata.

In some embodiments, the subscriber wager processor 350 queries the UME book provider system 150 for a particular subset of the wagerable UMEs by indicating relevant descriptor information in the query; the UME book provider system 150 can respond by outputting the subset of wagerable UMEs having descriptors that match the query. In some such embodiments, the UME book API 320 translates the query output from the subscriber wager processor 350 into an appropriate query input for the UME book provider system 150, and/or translates the response output from the UME book provider system 150 into an appropriate response input for the subscriber wager processor 350. For example, the television service provider system 110 may interface with multiple UME book provider systems 150, and each may be associated with a respective UME book API 320. In other embodiments, the UME book provider system 150 communicates all wagerable UMEs (or some particular subset not related to particular query parameters from the subscriber wager processor 350), such as based on a general pull or push routine. For example, the received set of wagerable UMEs are not pre-filtered for a particular subscriber 101, or the like.

The wagerable UMEs received from the UME book provider system 150 can be stored in the wager database 322. In some embodiments, the subscriber wager processor 350 can filter, sort, add or remove structure, and/or otherwise process the received wagerable UMEs to support features described herein, to conserve storage space in the wager database 322, and/or for any other suitable reason. Embodiments can periodically remove stale wagerable UMEs from the wager database 322. As described herein, each UME inherently ceases to be an uncertain event at some point in time when the event ultimately has a measurable outcome (e.g., a final score, a winner, etc.). As such, for each wagerable UME, the UME book provider system 150 and/or the television service provider system 110 can assign an expiration time, period of validity, or the like, which can typically be some time prior to the time at which the associated event has a measurable outcome. After that time, the wagerable UME can be considered stale. For example, a particular wagerable UME associated with a winner of a sporting event may become stale (e.g., such that associated wagers can no longer be placed) upon the first play of the sporting event. Alternatively, the same wagerable UME may stay valid with the odds and/or other wager parameters changing over the course of the sporting event, and the wagerable UME becomes stale only some fixed time (e.g., one minute) prior to the end of the sporting event.

The above description includes a number of techniques by which the subscriber wager processor 350 can effectively build a data space indicating of the set of live event content available to a subscriber 101 (e.g., ranging from a particular live event being watched, to all live events for which the subscriber 101 presently has rights, to all live events that can be offered by the television service provider system 110 regardless of subscription, etc.) and the set of wagerable UMEs applicable to that set of live event content. In some embodiments, such a data space is built proactively and globally for the television service provider system 110, such as for all subscribers 101, some particular grouping of subscribers 101, some particular timeframe, some geographical region, etc. Over time, the data space can be updated (e.g., periodically) based on updates to channel listings and/or program schedules from content networks 347, available wagerable UMEs from one or more UME book providers, aggregated subscriber information (e.g., changes in number, demographics, geographic distribution, etc.), and/or other factors. In other embodiments, such a data space is built proactively and specifically for an individual subscriber 101 at some initial time, such as when the subscriber 101 first enters a subscription agreement with the television service provider and/or with the UME book provider, when the subscriber 101 first subscribes to the particular UME interaction services provided jointly by the television service provider and the UME book provider, when the subscriber 101 first interacts with the subscriber wager interface engine 211 via the television receiver 120 (regardless of whether the subscriber 101 actually interacts with any wager offers at that time), etc. For example, the data space can be stored in association with the subscriber 101 as subscriber data in the subscriber database 342, and the subscriber wager processor 350 can update (e.g., periodically) the data space for the subscriber 101 based on changes in the subscriber's 101 account rights, updates to channel listings and/or program schedules from content networks 347, available wagerable UMEs from one or more UME book providers with which the subscriber 101 has a subscription, etc. In other embodiments, such a data space is built (and/or a previously built data space is updated) reactively for one or more subscribers 101 based on subscriber 101 interactions with the subscriber wager interface engine 211. For example, such building or updating can be in response to receiving an indication from the subscriber wager interface engine 211 (e.g., by the subscriber wager processor 350 from the television receiver 120 via the subscriber wager API 310) that a subscriber 101 has selected to view a wagering interface, has selected to access UME interactions, is presently viewing live content determined to be associated with one or more wagerable UMEs, etc.

As noted above, in addition to building a data space of presentable live content and the set of wagerable UMEs associated with that live content, determining which wager offers to generate for, and/or present to a subscriber 101 can involve further consideration of the subscriber's 101 experience level with such wager offers and/or with the subscriber wager interface engine 211. Embodiments of the subscriber wager processor 350 can determine a subscriber's 101 experience level using the subscriber modeler 354. In some implementations, the subscriber modeler 354 computes a wager experience score for a subscriber 101 based on accumulated data explicitly relating to the subscriber's UME interactions, such as a recorded number of UME interactions (e.g., number of wagers placed), types of UME interactions (e.g., which types of wagers has the subscriber 101 placed and/or how many of each type), success rate of prior UME interactions (e.g., win percentage), wager values associated with previous UME interactions (e.g., total monetary value previously wagered, average wager amount, etc.), frequency of UME interactions (e.g., how often does the subscriber 101 place a wager and/or interact with the subscriber wager interface engine 211), etc. Such explicit UME interaction data can be obtained by monitoring UME interactions via the subscriber wager interface engine 211, by obtaining subscriber data maintained by the UME book provider system 150 (e.g., which can record the number of UME interactions by the subscriber 101 with the UME book provider, including those not performed through the subscriber wager interface engine 211), and/or by obtaining UME interaction data for the subscriber 101 from other sources. In some implementations, some or all such explicit UME interaction data is stored in association with the subscriber 101 in the subscriber database 342.

Additionally or alternatively, implementations of the subscriber modeler 354 can compute a wager experience score for a subscriber 101 based on subscriber data (e.g., stored in the subscriber database 342) that implicitly suggests experience level. As one example, the subscriber modeler 354 can analyze the types of content watched by the subscriber 101 to estimate an interest level in live content associated with wagerable UMEs. As another example, the television service provider system 110 may have access to information about which applications are installed on a subscriber's devices (e.g., smartphone applications); geolocation data, calendar data, and/or other data suggesting whether the subscriber 101 has attended any live events, etc. Obtaining and/or monitoring such data for a subscriber 101 can involve obtaining and/or monitoring such data per individual subscriber, per subscriber household, per type of television receiver 120, per type of presentation device 250, etc.

Some embodiments of the subscriber modeler 354 compute an initial wager experience score. In some implementations, the initial wager experience score is always set to a default level (e.g., '0') representing no experience. In other implementations, data described above is used to compute the initial wager experience score (e.g., based on prior UME interaction data for the subscriber 101 obtained from the UME book provider system 150). The subscriber modeler 354 is configured to update (e.g., re-compute) the wager experience score over time for the subscriber 101 as the subscriber's 101 experience level changes. For example, the subscriber modeler 354 updates the wager experience score based on new explicit data points (e.g., each time the subscriber 101 places a new wager), and/or new implicit data points (e.g., each time the subscriber 101 watches a live event associated with wagerable UMEs). Such updates to the wager experience score can be performed responsive to each new relevant data point, periodically, and/or at any other suitable time. Computation of the wager experience score may or may not be related to the expression of the wager experience score. For example, computation of the wager experience score may involve aggregation of multiple data values, weighted subs, statistical computations, etc., resulting in any suitable scoring value. In some implementations, the wager experience score is expressed as that scoring value (e.g., as an integer, a real number, a multi-dimensional value, etc.). In other implementations, the wager experience score is a numeric score on a defined scale mapped from the scoring value. For example, the computed scoring value is converted to an integer wager experience score ranging between '0' (lowest novice level) and '100' (highest expert level). In other implementations, the wager experience score is expressed as one of a set of categorical identifiers. For example, the computed scoring value is determined to fall within a particular range of values, each mapped to one of a "novice," "intermediate," or "expert" designation as the wager experience score.

Based on the wager experience score, the subscriber wager processor 350 generates a set of wager offers to present to the subscriber 101 and adapts a UME interaction interface by which to present the wager offers to the subscriber 101. In some embodiments, generating the set of wager offers involves determining an experience level associated with each of the set of wagerable UMEs. In some implementations, one of the wager descriptors for the wagerable UME indicates its associated experience level. In other implementations, or one of the wager descriptors for the wagerable UME indicates an associated wager type, which is associated with the experience level in a lookup table, or the like. For example, a first wagerable UME may be indicated as a basic moneyline wager type, which may be associated in a lookup table with a "novice" experience level; while a second wagerable UME may be indicated as an in-play player proposition wager type, which may be associated in a lookup table with an "expert" experience level. In other implementations, one of the wager descriptors for the wagerable UME indicates an associated wager type, particular UME interaction interface templates and/or wager offer templates are selected based on the wager experience score, and the selected UME interaction interface templates and/or wager offer templates are configured for use only with wagerable UMEs having particular associated wager types. For example, a novice-level UME interaction interface template is selected for a particular subscriber 101 based on the wager experience score, and the novice-level UME interaction interface template provides for a "who will win" wager offer templates, which can only be populated by wagerable UMEs relating to basic moneyline wagers on the final outcome of a particular competition.

In some embodiments, the subscriber wager processor 350 uses the recommender 352 to generate the set of wager offers. The recommender 352 can be implemented as an artificial intelligence machine-learning (AI/ML) recommender engine. In some implementations, the recommender 352 establishes filtered, or otherwise organized data spaces, such as multi-dimensional vector spaces, for use in maximizing relevance of any one or more generated wager offers to the subscriber 101, maximizing an estimated likelihood that the subscriber 101 will engage if presented with one or more generated wager offers, etc. ML feedback mechanisms, such as dynamic feedback evaluation based on defined fitness functions, can be used to achieve such desired outcomes. For example, at least the wager experience score (and/or data used to compute the wager experience score) and a space of candidate wagerable UMEs are inputs to the recommender 352. Implementations of the recommender 352 can weight ML computations based on other factors, such as what the subscriber 101 is currently watching or recently watched, whether the subscriber 101 appears to be a fan of a particular team (e.g., based on prior UME interactions, viewing behavior, social media, etc.), implied betting behaviors, promotional considerations of the television service provider system 110 and/or of the UME book provider system 150, group viewing (e.g., based on a live event viewing group, detected presence of particular individuals and/or devices in proximity of a television receiver 120, etc.), physical location of the subscriber 101, etc. Some implementations of the recommender 352 can weight ML computations to achieve additional outcomes, such as to encourage intermediate-level subscribers 101 to push their comfort level by more heavily weighting certain types of wager offers with which the subscriber 101 has not previously engaged.

In some embodiments, generation of wager offers can include network infrastructure considerations. Certain types of wager offers may be highly dynamic and/or have a short life. For example, some in-play wagers have odds that can update every few seconds, or some proposition wagers may be offered just before an occurrence and only for a very short time. In such cases, limitations on bandwidth, inconsistent connectivity, high latency, and/or other network infrastructure considerations can potentially cause a subscriber 101 to not receive sufficiently updated information, cause a subscriber's 101 attempt to place a wager not to be recorded in time, cause unfair arbitrage or other opportunities for certain subscribers 101 based on relative network conditions, etc. As such, some embodiments of the subscriber wager processor 350 generate subscriber offers to avoid including any wager offers potentially impacted by such changes in network conditions. Other embodiments of the subscriber wager processor 350 can use the network modeler 356 to model present and/or future network conditions to determine whether any wager offers are likely to be impacted and/or in what ways, and the subscriber wager processor 350 can determine which wager offers to generate based on that determination.

Based on the above, the back-end wagering system 210 (e.g., the subscriber wager processor 350) can use at least the wager experience score to generate the set of wager offers, to select a UME interaction interface template, and to populate the selected UME interaction interface template with the generated set of wager offers in accordance with supported wager offer templates. Embodiments can then output instructions to the television receiver 120 over the subscriber network 335, by which the subscriber wager interface engine 211 can generate presentation (e.g., display) of the set of wager offers to the subscriber 101 in the UME interaction interface via a presentation device 250. In some embodiments, the back-end wagering system 210 generates some or all of the display output for presentation by the subscriber wager interface engine 211. In other embodiments, the back-end wagering system 210 generates data and/or instructions that are used by the subscriber wager interface engine 211 to generate some or all of the display output.

As one example, a wagerable UME relates to the final score of a football game between Team A and Team B and having a particular point spread and odds set by the UME book provider. Based on a first wager experience score for a first subscriber 101, the subscriber wager processor 350 selects a novice-level UME interaction interface template, which supports a "who will win" wager offer template. The subscriber wager processor 350 generates a wager offer from the wagerable UME in accordance with the wager offer template, such that the resulting wager offer presented to the subscriber 101 simply asks: "Who will win? Enter a wager amount and select Team A or Team B." Based on a second wager experience score for a second subscriber 101, the subscriber wager processor 350 selects an advanced-level UME interaction interface template, which supports many different types of wager offer templates. The subscriber wager processor 350 selects multiple supported wager offer templates (e.g., based on outputs of the subscriber modeler 354, the recommender 352, the network modeler 356, etc.) and generates multiple corresponding wager offers from the same wagerable UME in accordance with the selected wager offer templates. For example, the resulting wager offers presented to the second subscriber 101 include offers to place a simple moneyline wager on the outcome, to place an over/under wager offer based on the total score, to tease the odds and/or spread, to select the game for adding to a parlay wager, etc. In both cases, the subscriber wager processor 350 and the subscriber wager interface engine 211 can coordinate (e.g., via the subscriber wager API 310 and/or other components) to present the first generated wager offer to the first subscriber 101 in accordance with supported wager offer template in the entry-level UME interaction interface template and to present the second generated wager offers to the second subscriber 101 in accordance with supported wager offer templates in the advanced-level UME interaction interface template.

As described herein, the displayed UME interaction interface is configured to include one or more interface controls. The supported types of interactions and manner of interaction can depend on the particular type of presentation device 250 and/or television receiver 120 used to present the UME interaction interface. For example, a subscriber 101 can interact with interface controls using a remote control, touchscreen interface, mouse, physical buttons or keys, gestures, and/or in any other suitable manner. The subscriber wager interface engine 211 converts the interactions into one or more subscriber wager requests, which can be received by the back-end wagering system 210 (e.g., over the subscriber network 335 via the subscriber wager API 310). Embodiments of the back-end wagering system 210 (e.g., the subscriber wager processor 350) can generate one or more fulfillment requests in accordance with the one or more subscriber wager requests and can send the fulfillment request(s) to the UME book provider system 150 (e.g., via the UME book API 320). The UME book provider system 150 can then place a wager on one or more of the set of wagerable UMEs on behalf of the subscriber in accordance with the selected one of the set of wager offers (and any other interaction information), as indicated by the subscriber wager request(s) and the corresponding fulfillment request(s).

Embodiments can include other data exchanges for purposes of authentication, confirmation, payment, and/or other features. For example, as part of accepting a wager offer through the subscriber wager interface engine 211 (e.g., placing the wager), the subscriber 101 can receive a confirmation notification to confirm details prior to finalizing the wager, can receive a prompt to enter credentials or other authentication information (e.g., a code, passphrase, voice identification, biometric data, etc.), a request for payment details and/or payment confirmation, etc. In some embodiments, the same and/or additional interactions are handled by separate presentation devices 250, such as one or more mobile devices. As one example, a subscriber 101 uses a television remote control in communication with the television receiver 120 to select a particular wager offer, enter a wager amount, and submit the wager request to be placed by the UME book provider. Responsive to sending the wager request, the subscriber 101 receives a notification on his smart phone (e.g., in an application associated with the television service provider system 110, an application associated with the UME book provider system 150, a text message, an email communication, a social media application, etc.) that asks for one or more factors of authentication, confirmation, payment, etc. In some implementations, in response to placing the wager, the subscriber 101 receives a confirmation that the wager has been placed, that funds have been deducted, a timeframe within which the wager can be canceled or revised, and/or other relevant information. Such a confirmation can be received via the subscriber wager interface engine 211 (e.g., displayed on the presentation device 250) and/or on a separate presentation device 250.

Figure 4A:
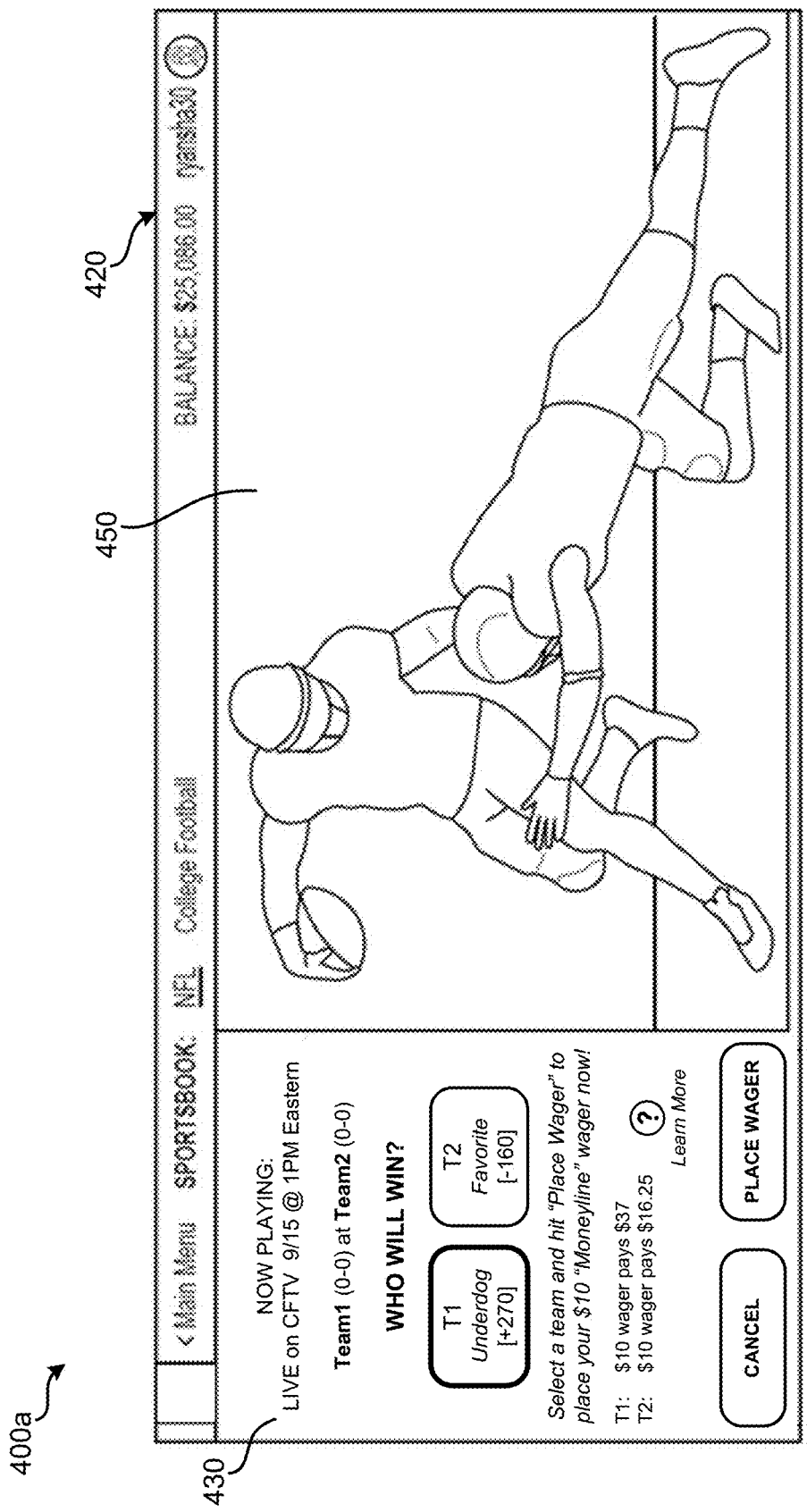
FIGS. 4A and 4B show an example of a novice-level UME interaction interface and an example of an advanced-level UME interaction interface, respectively.
Figure 4B:
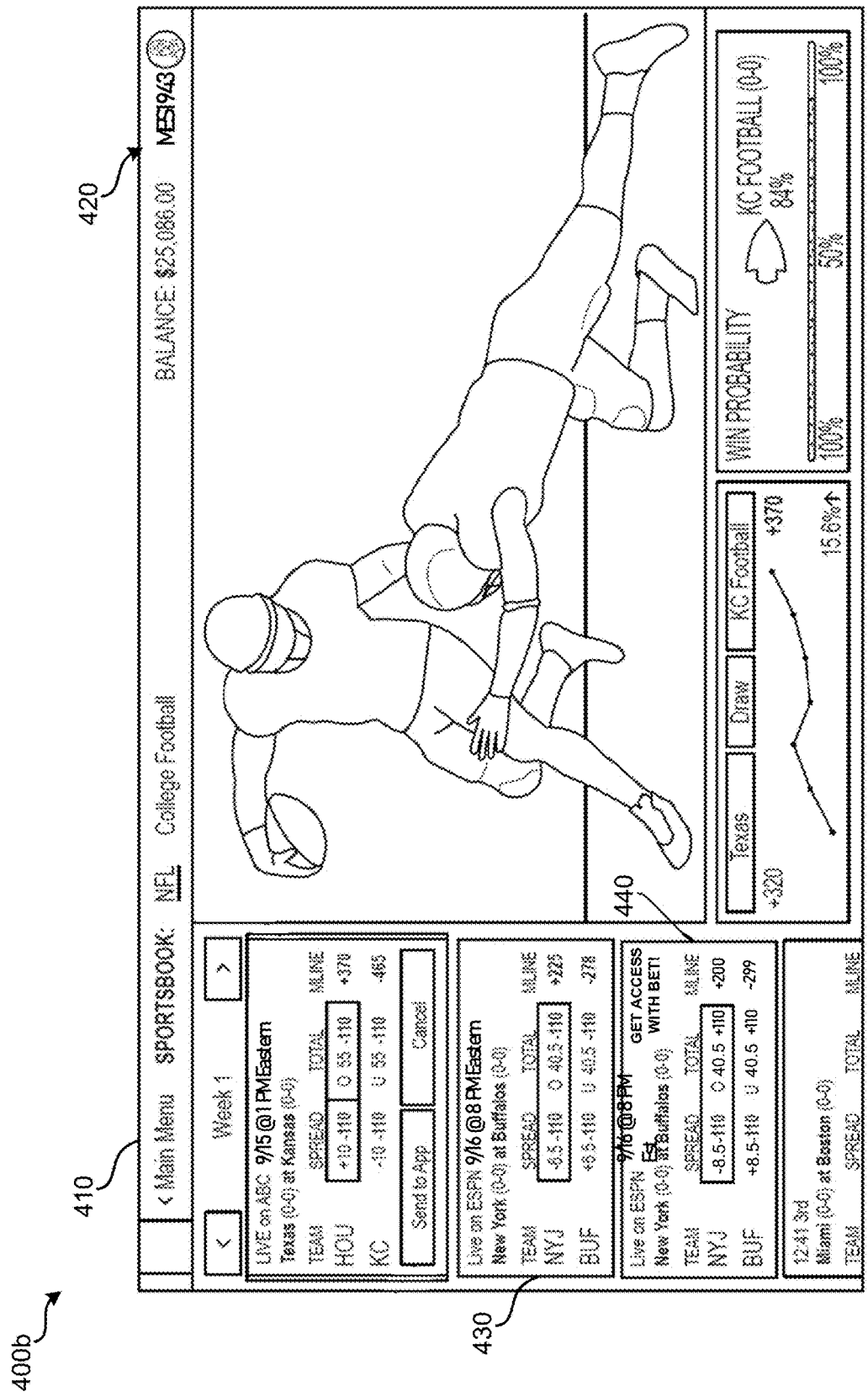

For the sake of illustration, FIGS. 4A and 4B show an example of a novice-level UME interaction interface 400a and an example of an advanced-level UME interaction interface 400b, respectively. Each UME interaction interface 400 can be presented by any suitable presentation device 250 in coordination with a subscriber wager interface engine 211 implemented by a television receiver 120. UME interaction interface 400 may allow a subscriber 101 to review, stage, or book wager offers (e.g., and/or perform other types of interactions) with the UME book provider system 150 via the television service provider system 110. In some embodiments, content may be viewed live (e.g., in a live content viewing window 450) while wager offers are viewed and/or interacted with. Some embodiments of the UME interaction interface 400 display subscriber 101 information in one or more subscriber information blocks 420, such as a subscriber identifier, balance of funds in the subscriber's account (e.g., with the UME book provider) available for placing wagers, current standings, win percentage, present wager experience score, etc. Embodiments of the UME interaction interface 400 can also permit subscribers 101 to obtain more descriptive information about wager offers, search for wager offers, filter or sort wager offers, provide credentials, provide payment information, etc.

The examples of FIGS. 4A and 4B are intended only to show two snapshots of possible UME interaction interfaces 400. For example, the illustrated novice-level UME interaction interface 400a is intended to generally show one possible type of novice-level wager offer as presented in one possible novice-level UME interaction interface template according to one possible novice-level wager offer template. Similarly, the illustrated advanced-level UME interaction interface 400b is intended to generally show one possible type of advanced-level wager offer as presented in one possible advanced-level UME interaction interface template according to one possible advanced-level wager offer template. Other implementations of UME interaction interfaces 400 can be generated based on different variations to the types of wager offers presented, the types of templates used, etc. Further, categorization of "novice" and "advanced" are purely intended for the sake of illustration. Other categorizations can be used, and any suitable number and type of gradations of experience level can be supported, each associated with a respective UME interaction interface 400, etc. For example, the novice-level UME interaction interface 400a can include multiple novice-level UME interaction interfaces 400a to support different levels within the novice experience level, to support different types of wager offers (e.g., or types of sports or other live event content, etc.), to provide the subscriber with variety, and/or for any other suitable purpose. Alternately or additionally, multiple gradations can be provided, each with a respective identifier, such as "newbie," "novice," "fish," "intermediate," "high-intermediate," "low-advanced," "advanced," "shark," etc. Thus, any particular associations between certain types of wager offers or other features and particular experience levels are not intended to be limiting and are only intended as an illustrative example.

In the example novice-level UME interaction interface 400a, a single wager offer interaction block 430 is shown. The single wager offer interaction block 430 shows a single simple wager offer, such as "who will win?" The subscriber 101 can select one of two teams currently playing and can submit the wager with a default wager amount. The illustrated wager offer is a standard, so-called "moneyline" wager. In its simplest form, the subscriber 101 wagers a certain wager value on a selected side (winning team, winning player, etc.) of a selected competition (e.g., sports game, match, tournament, race, etc.). If the selected side wins the selected competition, the sportsbook pays an amount due based on the wager value and associated wager odds. In each moneyline wager, there is typically a favored side (expected to win) and an underdog side (expected to lose). The wager odds are typically listed as negative for the favored side and as positive for the underdog side. In the illustrated example, in a college football game, the UME book provider is giving odds of +270 for the underdog side and −160 for the favored side. A $10 wager on the underdog team would pay out $37 (the wagered $10 plus $27 of profit); while a $10 wager on the favored team would pay out $16.25 (the wagered $10 plus $6.25 of profit). The particular wager odds for such moneyline bets are set by the UME book provider based, for example, on a points spread for the game with the addition of a so-called "house edge" that helps ensure the sportsbook operator will profit over time (also referred to as "vig," "juice," etc.).

In some implementations, the novice-level UME interaction interface 400a characterizes a wager offer by its assigned wager odds, points spread, and/or other details. In other implementations, the beginner interface characterized a wager offer in a more results-centric manner. For example, the illustrated novice-level UME interaction interface 400a shows wager odds and a results-based explanation of specific payouts associated with the wager amount. In other implementations, a simple wager offer is presented along with selectable access to one or more levels of additional explanation (e.g., an information interface control is illustrated). Selecting the information interface control can present the subscriber with more specific payout information, odds, spreads, etc. Such information may allow (or even encourage) the subscriber to become a more confident and knowledgeable better, which may facilitate advancement to more advanced betting levels.

Slightly more advanced wager offers can be provided in additional gradations of novice-level UME interaction interfaces 400a, in an intermediate-level UME interaction interface 400, etc. As one example, an intermediate-level UME interaction interface 400 can facilitate point spread wager offers. In basic moneyline wagers, the wager is typically based only on whether a side will win or lose, and odds are set by the UME book provider to incentivize betting on both sides. In a point spread wager, the UME book provider assigns a number of points by which the favored team must win in order for a wager on that team to pay out. The points spread seeks to even the chances that a wager on either side will pay out. For example, a wager offer may read: "Team A (−7) vs. Team B: Will Team A cover the spread?" Here, for purposes of the wager offer, Team A is only considered to have won the competition if their score exceeded Team B's score by more than 7. Similarly, a wager on the underdog (Team B in this example) pays out if the underdog either wins, or loses by less than the point spread. In some cases, if the score difference matches the point spread (e.g., if Team A won by exactly 7 points in the above example), neither side wins, and both sides' wagers are refunded (sometimes called a "push"). Point spread wager offers can also have odds, such as house edge odds (e.g., "minus 110" odds). In some cases, a competition between evenly matched teams can have a zero-point spread, which can effectively devolve to a moneyline wager offer. In some cases, point spread wager offers can have dynamically shifting parameters, and may be indicated in the intermediate-level betting interface as such. For example, if the UME book provider detects an imbalance in wagers toward one side, they may adjust the odds and/or point spread in an attempt to encourage wagering on the other side.

As another example, an intermediate-level UME interaction interface 400 can facilitate "over/under" wager offers (or "totals" wager offers). In such bets, the subscriber 101 can select whether they think the total number of points scored by both sides of a selected competition will be over or under a total point value listed in the wager offer. Such wagers typically include odds (e.g., house edge odds plus additional odds seeking to equalize wager values on both sides), and it typically does not matter which side wins or loses. Some implementations of the intermediate-level betting interface can facilitate additional types of over/under wager offers, such as based on total scoring for a particular team or player, for a particular segment of a competition (e.g., period, quarter, half, etc.), for a particular time period (e.g., in the last five minutes of the competition), etc. In some implementations, the intermediate-level betting interface can facilitate over/under wager offers for non-score totals, such as based on a total number of laps finished by a driver in an automobile race, total number of passing yards in a football game, total number of rounds of a boxing match, etc.

As another example, an intermediate-level UME interaction interface 400 can facilitate parlay wager offers, such as one or more moneyline parlay wager offers. As described above, a basic moneyline wager picks a single competition outcome. In contrast, a moneyline parlay wager combines multiple picks for multiple competition outcomes. For example, a moneyline parlay that combines bets on three competitions may pay out a greater amount than would making the same picks with separate basic moneyline wagers on each of the three competitions. Some implementations can also facilitate parlay point spread wager offers, parley over/under wager offers, and/or other parlay offers. In some implementations, the intermediate-level betting interface presents the user with prefabricated parlay wager offers, such as a predetermined grouping of moneyline wagers, point spread wagers, or the like, with associated information. In other implementations, the intermediate-level betting interface presents the subscriber with a parlay card interface, or the like, in which the subscriber can select multiple wager offers to accumulate into a single parlay wager.

As another example, an intermediate-level UME interaction interface 400 can facilitate so-called "futures" wager offers. Such futures wagers generally provide for wagering on a future outcome. For example, in college basketball in the United States, such futures wagers may relate to a winning team over the entire season, winning team in the National Collegiate Athletics Association (NCAA) March Madness Tournament, winner of the Naismith Award, etc. Embodiments of the intermediate-level betting interface can typically present such futures wager offers in a similar manner to moneyline wager offers, such as by providing odds, payouts, etc. However, rather than listing the wager offer as a match-up of sides in a particular competition, the futures wager offer may be presented in the interface as a listing of all potential contenders for the future occurrence. For example, a subscriber 101 may place a futures wager on a particular golfer to win the Professional Golf Association (PGA) Tour, with the potential payout for such a wager being based on futures odds set by the UME book provider (e.g., typically relatively large odds, such as 100-to-1).

Turning to FIG. 4B, an example of an advanced-level UME interaction interface 400b is shown. In some implementations, certain portions of the advanced-level UME interaction interface 400b can be the same as those of the novice-level UME interaction interface 400a. Typically, the advanced-level UME interaction interface 400b can have multiple wager offer interaction blocks 430, 440 for multiple wager offers. In some implementations, interactions with the wager offer interaction blocks 430, 440 provide access to additional layers, windows, blocks, etc. of the advanced-level UME interaction interface 400b. For example, selecting wager offer interaction block 430 can cause a new portion of the interface to open (e.g., overlaid on some or all of the prior interface) with additional details, options, interaction controls, etc.

Embodiments of the advanced-level UME interaction interface 400b can provide advanced-level subscribers 101 with access to some or all types of wager offers. For example, in addition to moneyline, point spread, over/under, and parlay wager offers that may be accessible in the beginner-level and/or intermediate-level UME interaction interfaces 400, the advanced-level UME interaction interface 400b may facilitate many additional types of wager offers. The wager offers can be provided in a manner that provides for efficient location of desirable wager offers. In some implementations, the wager offers are presented along with interaction controls that allow for filtering (e.g., by sport, by team, by player, by wager type, by timeframe, etc.), sorting (e.g., alphabetically, by popularity, by odds, etc.), searching, or otherwise navigating the wager offers. In some implementations, a subset of wager offers is initially presented based on a determination (e.g., by the recommender 352) of what would likely interest the subscriber 101. The subscriber 101 may be able to navigate from the initially recommended offers to other offers, as desired.

As one example, an advanced-level UME interaction interface 400b can facilitate various types of proposition ("prop") wager offers. Prop wagers can generally include wagers on almost any type of specifiable occurrence. Some implementations of the advanced-level UME interaction interface 400b provide a category of prop wager called player prop wagers, in which subscribers 101 can wager on a variety of specific occurrences for a particular player, such as a player's total number of rushing yards or interceptions in American football, a player's homeruns or hits in baseball, a player's rebounds or assists in basketball, etc. Some implementations of the advanced-level UME interaction interface 400b facilitate "player" prop wagers for groups of players, teams, etc., such as total number of quarterback sacks by a team. Prop wager offers can be associated with a particular timeframe, such as for a particular competition (e.g., total free throw attempts by a particular player in a particular basketball game), for a portion of a competition (e.g., number of penalties on a particular team in the first half of a soccer game), for a tournament (e.g., number of stolen bases by a baseball player during the World Series), for a particular timeframe (e.g., a month, post-season, etc.), etc. Some embodiments of the advanced-level betting interface can promote non-standard types of prop wagers that still relate to competition occurrences, such as the results of a coin toss in the Super Bowl.

Some embodiments of the advanced-level UME interaction interface 400b can provide access only to a limited number of such prop wager offers in a "prop wagers" section of the interface. Other embodiments of the advanced-level UME interaction interface 400b can provide access to large numbers and varieties of prop wager offers, and can include various navigation tools to assist with finding such wager offers. For example, some implementations of the advanced-level UME interaction interface 400b include interface tools to sort, filter, search, etc. listings of prop wager offers, such as to discover available prop wager offers by team, by player, by day, by sport, by occurrence (e.g., all National Football League Receiving Props), etc.

Because prop wagers can so widely vary, certain prop wager offers may be legal in certain jurisdictions, while others may not (or some may not be legal in any jurisdictions). For example, in the United States, certain types of wagers may have different legal implications in different states. As such, some embodiments automatically filter presentation of prop wager offers for any given subscriber based on geolocation information for that subscriber 101 (e.g., based on data in the subscriber database 342). For example, some embodiments of the advanced-level UME interaction interface 400b can promote non-sports-related prop wagers, such as relating to the outcome of a particular reality television series, the total box office numbers for a new movie, etc. While many such wagers may not be legal in certain jurisdictions, some implementations of the advanced-level UME interaction interface 400b can present such prop wager offers in a manner that is legal, such as by gamifying such prop wagers in a points-based, social networking, or other type of interface that does not provide for an exchange of actual monetary value.

As another example, an advanced-level UME interaction interface 400b can facilitate co-called "live" and/or "in-play" wager offers. With both types of wager offers, odds, and/or other wager parameters, tend to change during a competition, and subscribers 101 can place wagers during the competition. For example, "in-play" wager parameters tend to change less frequently (e.g., between each inning, quarter, half, etc.), while "live" wager parameters tend to change more quickly (e.g., between each play, each change of possession, etc.). In some cases, such in-play or live wager offers can include moneyline wager offers, point spread wager offers, and/or other wager offers described herein, except with highly dynamic wager parameters. Some implementations of the advanced-level UME interaction interface 400*b* group such wager offers together, while others separate live and in-play wager offers. In some implementations, the advanced-level UME interaction interface 400*b* indicates a rate of change associated with such wager offers, such as by listing an average time between updates to wager parameters (e.g., "Odds updated every 20 seconds"), a time limit for placing the wager (e.g., "This offer expires in 11 seconds"), etc. As described herein, updating the betting interface with wager parameters and recording subscriber wager offers can involve communications between various systems controlled by various entities over various networks. In some implementations, the resulting system latencies may exceed the rate of change in some live wager parameters, such that such live wager offers may not be supported. Some embodiments generally monitor such system-level latencies (e.g., by the network modeler 356) and determine (e.g., dynamically) whether to enable or disable access to certain live (e.g., or even in-play) wager offers, accordingly.

As another example, an advanced-level UME interaction interface 400*b* can facilitate more advanced versions of the same types of wager offers available in less advanced UME interaction interfaces 400. For example, as described above, an intermediate-level betting interface may present various parlay wager offers to subscribers 101. The advanced-level UME interaction interface 400*b* may similarly present various parlay wager offers, but with additional controls, such as control over payouts, sequencing, and/or even wager parameters. For example, implementations of the intermediate-level betting interface can facilitate so-called "round robin" parlay wagers, "teaser" parlay wagers, "pleaser" parlay wagers, etc. For example, for a teaser parlay wager offer, the advanced-level UME interaction interface 400*b* can include an interactive slider bar (or any other interface control) to permit a subscriber to "tease" the point spread (or over/under, or the like) of a particular competition upward or downward, and the payout displayed for the wager offer can dynamically update responsive to the change.

Embodiments of the advanced-level UME interaction interface 400*b* can tend to present the subscriber 101 contemporaneously with appreciably more information, as compared to novice-level, or intermediate-level UME interaction interface 400. As one example, when placing the wager, the novice-level UME interaction interface 400*a* may display only the wager offer being considered by the subscriber 101, as such subscribers 101 may typically have only one active wager (or a small number of active wagers) at any given time. In contrast, an advanced-level UME interaction interface 400*b* may present the subscriber 101 with all their active wagers, all related active wagers (e.g., for the same competition, the same sport, the same time period, etc.), etc., alongside presentation of one or more wager offers being presently considered by the subscriber 101. A more advanced subscriber 101 may have many active wagers at a time and may place additional wagers based, at least in part, on other active wagers. For example, in a single competition, an advanced subscriber 101 may have placed a point spread wager and one or more prop wagers, or an advanced subscriber 101 may implement one or more hedging strategies (e.g., reducing downside in exchange for reducing maximum potential upside), middling strategies (e.g., by placing in-play wagers on both sides of a competition to control both sides of a point spread in hopes that a final score difference will fall somewhere in the middle of the spread), etc.

In some implementations, the advanced-level UME interaction interface 400*b* can also include additional statistics, and/or other information used by more advanced subscribers 101 to gauge wagering strategies. Some such advanced-level UME interaction interface 400*b* include customizable interface blocks, such as widgets, sub-windows, etc., in which subscribers 101 can select which information to display. Some implementations of the advanced-level UME interaction interface 400*b* allow advanced subscribers 101 to set prefabricated and/or custom types of alerts. As one example, an advanced subscriber 101 may desire to be alerted about any point spread wager offers in professional American football competitions for which the point spread is any of 2.5, 3.5, 6.5, or 7.5 (i.e., one half-point away from a so-called "key number") and having odds within a range between −100 and −118.

Some embodiments of UME interaction interfaces 400 can provide promotional (e.g., limited-time) wager offers, such as so-called "odds boost" wager offers, in which the house edge is reduced, or the odds are otherwise improved in favor of the subscriber 101. In some cases, such wager offers can be presented in appropriate levels of simplicity for various levels of betting interfaces. Some embodiments can evaluate types of wagers previously made by a particular subscriber 101 and can use the recommender 352 to select one or more promotional wager offers that may be of interest to the particular subscriber 101, such as to introduce a less advanced subscribers 101 to more advanced types of wager offers. As an example, a subscriber 101 who has never placed prop wagers or parlay wagers may be presented with a simplified promotional wager offer, such as "Win $2 for every $1 you bet, if U.S. Women's Soccer Team (Favored) wins today AND Joan Smith (League Leading Scorer) scores at least 2 goals."

Some embodiments of UME interaction interfaces 400 can provide additional configuration tools for interactively proposing wager offers. As one example, advanced-level subscribers 101 may be presented with access to a "My Parlay" tool via the advanced-level UME interaction interface 400*b*. For example, such a "My Parlay" tool can allow subscribers 101 to select multiple wager offers for combination into a parlay wager. In response to such a selection, the television service provider system 110 and the UME book provider system 150 can coordinate to compute odds and/or other parameters for the proposed parlay and to determine whether to accept the proposal. If accepted, the proposal can be used to generate a corresponding wager offer for presentation to the proposing subscriber 101 and/or to some or all other subscribers 101. Similarly, embodiments of the UME interaction interface 400 can present subscribers 101 with a "My Prop" tool by which to propose one or more type of prop wagers. Such custom prop wagers can be used to generate wager offers, shared with other subscribers 101, shared to a social media account as a non-subscription wager, etc.

Figure 5:
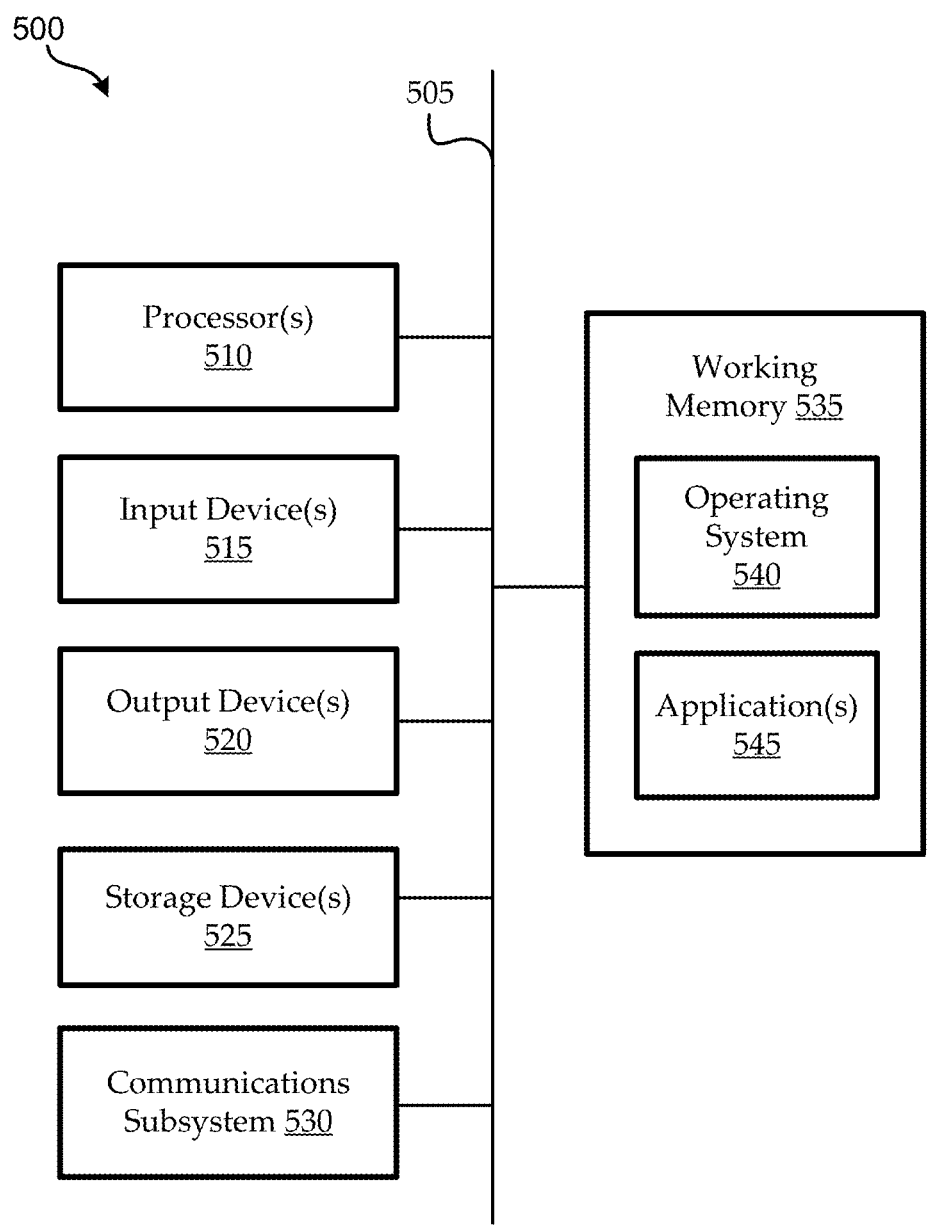
FIG. 5 provides a schematic illustration of one embodiment of a computer system that can implement various system components and/or perform various steps of methods provided by various embodiments.

Embodiments of the back-end wagering system 210, or components thereof, can be implemented on, and/or can incorporate, one or more computer systems, as illustrated in FIG. 5. FIG. 5 provides a schematic illustration of one embodiment of a computer system 500 that can implement various system components and/or perform various steps of methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, video decoders, and/or the like). The processors 510 can implement the subscriber wager processor 350.

As illustrated, some embodiments include one or more input devices 515 and/or output devices 520. The computer system 500 is configured to interface with additional computers, such that the input devices 515 and/or output devices 520 include various physical and/or logical interfaces (e.g., ports, etc.) to facilitate computer-to-computer interaction and control. Embodiments of the input devices 515 and output devices 520 can be configured to implement the subscriber wager API 310 and/or the UME book API 320, so that the computer system 500 can interface with television receivers 120, UME book provider systems 150, etc.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 525 include the non-transient memory 240. In some embodiments, the storage devices 525 can include one or more of the wager database 322, the subscriber database 342, and the content database 344.

The computer system 500 can also include a communications subsystem 530, which can include, without limitation, any suitable antennas, transceivers, modems, network cards (wireless or wired), infrared communication devices, wireless communication devices, chipsets (such as a Bluetooth™ device, an 802.11 device, a WiFi device, a WiMax device, cellular communication device, etc.), and/or other communication components. As illustrated, the communications subsystem 530 generally includes any suitable components for facilitating communications with subscriber network interface 330, provider network interface 340, subscriber networks 335, provider networks 345, content networks 347, etc.

In many embodiments, the computer system 500 will further include a working memory 535, which can include a RAM or ROM device, as described herein. The computer system 500 also can include software elements, shown as currently being located within the working memory 535, including an operating system 540, device drivers, executable libraries, and/or other code, such as one or more application programs 545, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 540 and the working memory 535 are used in conjunction with the one or more processors 510 to implement features of the back-end wagering system 210. Embodiments of the one or more processors 510 can implement the subscriber wager processor 350, such that the operating system 540 and the working memory 535 can implement features of the recommender 352, subscriber modeler 354, network modeler 356, etc. In some embodiments, the working memory 535 includes non-transient, processor-readable memory having instructions stored thereon, which, when executed, cause the one or more processors 510 to perform steps including: determining live event content that is presentable to a subscriber in accordance with a content subscription between the subscriber and the television service provider; querying a UME book provider for a set of wagerable UMEs available for the live event content, the subscriber having a UME interaction subscription with the UME book provider; determining a wager experience score assigned to the subscriber by the television service provider; generating a set of wager offers to present to the subscriber based at least on the set of wagerable UMEs and the wager experience score; selecting a UME interaction interface template based on the wager experience score, the UME interaction interface template being one of a plurality of experience-adaptive UME interaction interfaces, each adapted for a respective one or more wager experience scores, and each associated with a respective set of wager offer templates adapted for the respective one or more wager experience scores; and outputting, to a television receiver of the subscriber, instructions to generate the UME interaction interface for display to the subscriber via a presentation device in accordance with the UME interaction interface template being populated with the set of wager offers based on the respective set of wager offer templates.

A set of these instructions and/or codes can be stored on a non-transitory computer-readable storage medium, such as the non-transitory storage device(s) 525 described above. In some cases, the storage medium can be incorporated within a computer system, such as computer system 500. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 500 and/or can take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which can be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 can cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media can be involved in providing instructions/code to processor(s) 510 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 500. The communications subsystem 530 (and/or components thereof) generally will receive signals, and the bus 505 then can carry the signals (and/or the data, instructions, etc., carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device.

Figure 6:
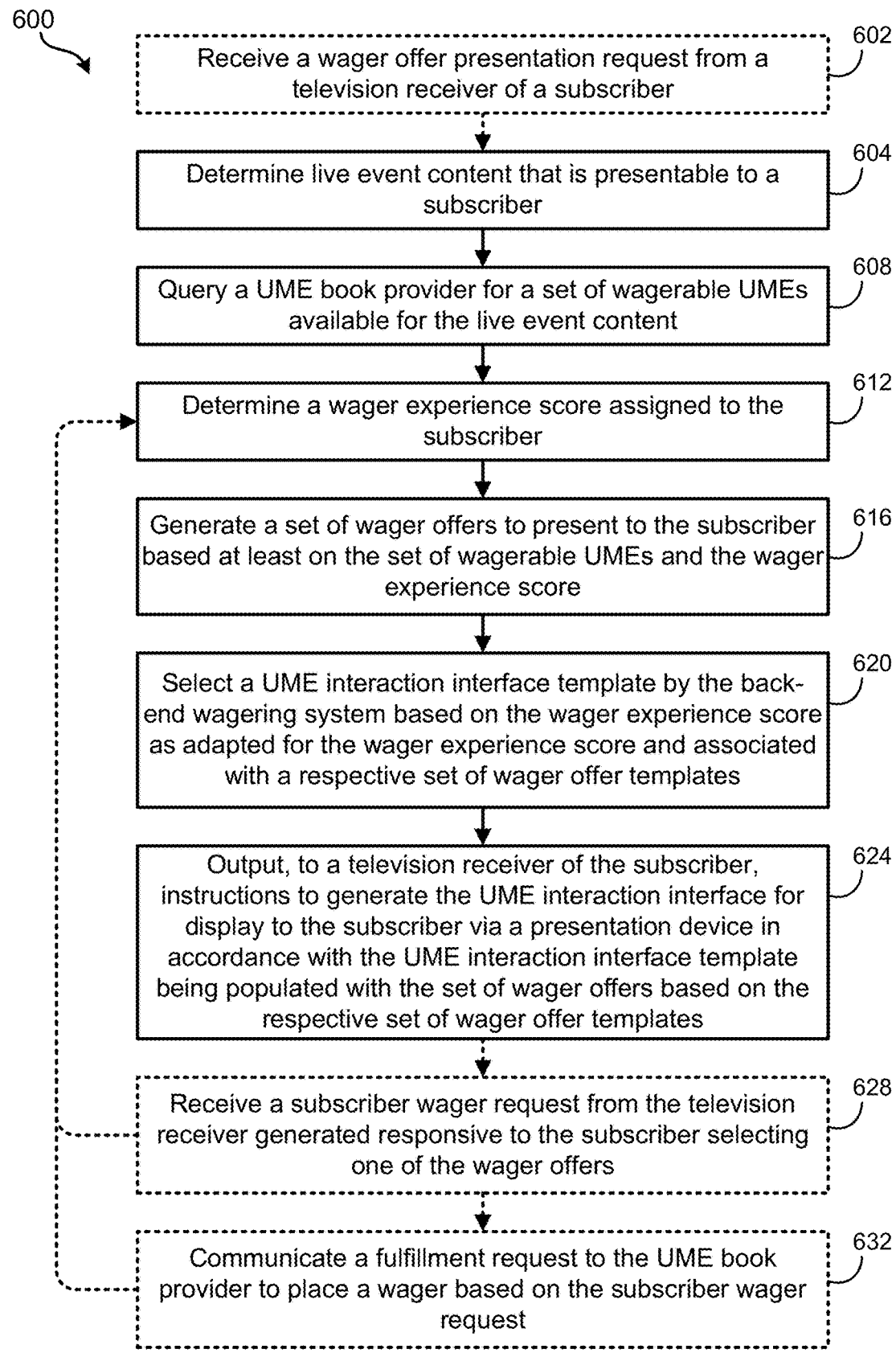
FIG. 6 shows a flow diagram of an illustrative method for experience-adaptive interaction with UMEs, according to various embodiments.

FIG. 6 shows a flow diagram of an illustrative method 600 for experience-adaptive interaction with uncertain measurable events (UMEs), according to various embodiments. The method 600 can be implemented using any suitable system, including those described above in FIGS. 1-3 and 5. Embodiments of the method 600 begin at stage 604 by determining (e.g., by a back-end wagering system of a television service provider) live event content that is presentable to a subscriber in accordance with a content subscription between the subscriber and a television service provider. In some embodiments, the determining at stage 604 involves receiving, from the television receiver, an indication of a television channel presently being presented via the content network to the subscriber in accordance with the content subscription, and querying a broadcast programming schedule to determine the live content event presently being provided via the television channel. At stage 608, embodiments can query a UME book provider for a set of wagerable UMEs available for the live event content, the subscriber having a UME interaction subscription with the UME book provider. In some embodiments, each wagerable UME is associated with a respective set of wager parameters defined by the UME book provider.

At stage 612, embodiments can determine a wager experience score assigned to the subscriber by the television service provider. In some embodiments, determining the wager experience score includes assigning the wager experience score to the subscriber based at least on a quantity and/or quality of prior UME interactions associated with the subscriber. At stage 616, embodiments can generate a set of wager offers to present to the subscriber based at least on the set of wagerable UMEs and the wager experience score. In some embodiments, each wager offers is defined in accordance with one or more of the wagerable UMEs. For example, each wager offer has defined parameters corresponding to wager parameters associated with associated wagerable UMEs, as set by the UME book provider. In some embodiments, generating the set of wager offers includes generating a subscriber model based at least on a level of prior subscriber engagement with UME interactions and/or live event content and inputting the subscriber model and the set of wagerable UMEs to a machine-learning-based recommender engine to generate the set of wager offers for the subscriber.

As described herein, the same wagerable UME(s) can yield different wager offers (e.g., and/or different presentations of the same or different wager offers) for different wager experience scores. In some embodiments, the determining at stage 612 involves determining a first wager experience score assigned to a first subscriber by the television service provider, and determining a second wager experience score assigned to a second subscriber by the television service provider, such that the second wager experience score is different from the first wager experience score. In such an embodiments, the generating at stage 616 can include generating a first wager offer to present to the first subscriber based on one of the set of wagerable UMEs and the first wager experience score, and generating a second wager offer to present to the second subscriber based on the one of the set of wagerable UMEs and the second wager experience score, such that the second wager offer is different from the first wager offer.

At stage 620, embodiments can select a UME interaction interface template based on the wager experience score. The UME interaction interface template is one of multiple experience-adaptive UME interaction interface templates, each adapted for a respective one or more wager experience scores. Each UME interaction interface templates is associated with a respective set of wager offer templates adapted for the respective one or more wager experience scores. In some embodiments, the experience-adaptive UME interaction interfaces include at least a beginner-level UME interaction interface based on a first one or more wager experience scores, an intermediate-level UME interaction interface based on a second one or more wager experience scores, and an advanced-level UME interaction interface based on a third one or more wager experience scores. At stage 624, embodiments can output, to a television receiver of the subscriber, instructions to generate the UME interaction interface for display to the subscriber via a presentation device in accordance with the UME interaction interface template being populated with the set of wager offers based on the respective set of wager offer templates.

Some embodiments of the method 600 begin at stage 602, prior to some or all of stages 604-624, by receiving a wager offer presentation request from the television receiver. In some cases, the wager offer presentation request is generated responsive to an initial setup of the subscriber's account, preferences, etc. In other cases, the wager offer presentation request is generated at the television receiver responsive to any subscriber interaction that results in entry to a UME interaction interface. In other cases, the wager offer presentation request is generated responsive to any interaction with the UME interaction interface that triggers display of and/or updates to wager offers, experience levels, search results, etc. In some cases, the outputting at stage 624 is responsive to the receiving at stage 602. For example, some or all of stages 604-620 are performed transparently to the subscriber at any suitable time, and the output is generated responsive to the wager offer presentation request. In other cases, additional ones of stages 604-624 of the method 600 can be responsive to the receiving at stage 602. For example, determinations of live event content, wagerable UMEs, wager experience scores, wager offers, etc. are made responsive to the wager offer presentation request.

Some embodiments of the method 600 can continue after the UME interaction interface has been generated and output at the subscriber's presentation device. For example, at stage 628, some embodiments can receive a subscriber wager request from the television receiver. The subscriber wager request can be generated responsive to the subscriber selecting one of the set of wager offers as displayed in the UME interaction interface. Some such embodiments, at stage 632, can communicate a fulfillment request to the UME book provider to place a wager on one or more of the set of wagerable UMEs on behalf of the subscriber in accordance with the selected one of the set of wager offers indicated by the subscriber wager request. In some embodiments, UME interactions involved with and/or resulting from stages of the method (e.g., stages 628 and/or 632) can be fed back to contribute to subsequent determinations of wager experience score, and/or for other purposes.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television service provider system for experience-adaptive interaction with uncertain measurable events (UMEs), the system comprising:
   a subscriber wager processor; and
   a non-transient processor-readable memory having instructions stored thereon which, when executed, cause the subscriber wager processor to perform steps comprising:
      determining live event content that is presentable to a subscriber in accordance with a content subscription between the subscriber and the television service provider;
      querying a UME book provider for a set of wagerable UMEs available for the live event content, the subscriber having a UME interaction subscription with the UME book provider;
      determining a wager experience score assigned to the subscriber by the television service provider;
      generating a set of wager offers to present to the subscriber based at least on the set of wagerable UMEs and the wager experience score;

selecting a UME interaction interface template based on the wager experience score, the UME interaction interface template being one of a plurality of experience-adaptive UME interaction interface templates, each adapted for a respective one or more wager experience scores, and each associated with a respective set of wager offer templates adapted for the respective one or more wager experience scores; and outputting, to a television receiver of the subscriber, instructions to generate the UME interaction interface for display to the subscriber via a presentation device in accordance with the UME interaction interface template being populated with the set of wager offers based on the respective set of wager offer templates.

2. The system of claim 1, wherein the instructions, when executed, cause the subscriber wager processor to perform the steps further comprising:

receiving a subscriber wager request from the television receiver, the subscriber wager request generated responsive to the subscriber selecting one of the set of wager offers as displayed in the UME interaction interface.

3. The system of claim 2, wherein the instructions, when executed, cause the subscriber wager processor to perform the steps further comprising:

communicating a fulfillment request to the UME book provider to place a wager on one or more of the set of wagerable UMEs on behalf of the subscriber in accordance with the selected one of the set of wager offers indicated by the subscriber wager request.

4. The system of claim 1, wherein:

the determining the wager experience score comprises determining a first wager experience score assigned to a first subscriber by the television service provider, and determining a second wager experience score assigned to a second subscriber by the television service provider, the second wager experience score being different from the first wager experience score; and the generating the set of wager offers comprises generating a first wager offer to present to the first subscriber based on one of the set of wagerable UMEs and the first wager experience score, and generating a second wager offer to present to the second subscriber based on the one of the set of wagerable UMEs and the second wager experience score, the second wager offer being different from the first wager offer.

5. The system of claim 1, wherein the determining the live event content comprises:

receiving, from the television receiver, an indication of a television channel presently being presented via a content network to the subscriber in accordance with the content subscription; and querying a broadcast programming schedule to determine the live content event presently being provided via the television channel.

6. The system of claim 1, wherein the instructions, when executed, cause the subscriber wager processor to perform the steps further comprising:

receiving a wager offer presentation request by the UME book provider from the television receiver, wherein at least the outputting is performed responsive to the receiving.

7. The system of claim 1, wherein:

each of the set of wagerable UMEs is associated with a respective set of wager parameters defined by the UME book provider; and each of the set of wager offers is defined in accordance with one or more of the set of wagerable UMEs and with one or more of the respective set of wager parameters associated with the one or more of the set of wagerable UMEs.

8. The system of claim 1, further comprising:

a subscriber database having, stored thereon, subscriber information indicating a quantity of prior UME interactions associated with the subscriber, wherein the determining the wager experience score comprises assigning the wager experience score to the subscriber based at least on the quantity of prior UME interactions associated with the subscriber.

9. The system of claim 1, further comprising:

a subscriber database having, stored thereon, subscriber information indicating a level of prior subscriber engagement with UME interactions and/or live event content, wherein the instructions, when executed, cause the subscriber wager processor to generate the set of wager offers by:

generating a subscriber model based at least on the level of prior subscriber engagement with UME interactions and/or live event content; and inputting the subscriber model and the set of wagerable UMEs to a machine-learning-based recommender engine to generate the set of wager offers for the subscriber.

10. The system of claim 1, further comprising:

a subscriber wager application programming interface (API) to coordinate communications between the subscriber wager processor and the television receiver over one or more subscriber networks; and a UME book API 320 to coordinate communications between the subscriber wager processor and the UME book provider over one or more provider networks.

11. A method for experience-adaptive interaction with uncertain measurable events (UMEs), the method comprising:

determining, by a back-end wagering system of a television service provider, live event content that is presentable to a subscriber in accordance with a content subscription between the subscriber and the television service provider;

querying a UME book provider, by the back-end wagering system, for a set of wagerable UMEs available for the live event content, the subscriber having a UME interaction subscription with the UME book provider;

determining, by the back-end wagering system, a wager experience score assigned to the subscriber by the television service provider;

generating, by the back-end wagering system, a set of wager offers to present to the subscriber based at least on the set of wagerable UMEs and the wager experience score;

selecting a UME interaction interface template by the back-end wagering system based on the wager experience score, the UME interaction interface template being one of a plurality of experience-adaptive UME interaction interface templates, each adapted for a respective one or more wager experience scores, and each associated with a respective set of wager offer templates adapted for the respective one or more wager experience scores; and outputting, by the back-end wagering system to a television receiver of the subscriber, instructions to generate the UME interaction interface for display to the subscriber via a presentation device in accordance with the UME interaction interface template being populated with the set of wager offers based on the respective set of wager offer templates.

12. The method of claim 11, further comprising:
receiving a subscriber wager request by the back-end wagering system from the television receiver, the subscriber wager request generated responsive to the subscriber selecting one of the set of wager offers as displayed in the UME interaction interface; and
communicating, by the back-end wagering system, a fulfillment request to the UME book provider to place a wager on one or more of the set of wagerable UMEs on behalf of the subscriber in accordance with the selected one of the set of wager offers indicated by the subscriber wager request.

13. The method of claim 11, wherein:
the determining the wager experience score comprises determining a first wager experience score assigned to a first subscriber by the television service provider, and determining a second wager experience score assigned to a second subscriber by the television service provider, the second wager experience score being different from the first wager experience score; and
the generating the set of wager offers comprises generating a first wager offer to present to the first subscriber based on one of the set of wagerable UMEs and the first wager experience score, and generating a second wager offer to present to the second subscriber based on the one of the set of wagerable UMEs and the second wager experience score, the second wager offer being different from the first wager offer.

14. The method of claim 11, wherein the determining the live event content comprises:
receiving, from the television receiver, an indication of a television channel presently being presented via a content network to the subscriber in accordance with the content subscription; and
querying a broadcast programming schedule to determine the live content event presently being provided via the television channel.

15. The method of claim 11, further comprising:
receiving a wager offer presentation request by the back-end wagering system from the television receiver,
wherein at least the outputting is performed responsive to the receiving.

16. The method of claim 11, wherein:
each of the set of wagerable UMEs is associated with a respective set of wager parameters defined by the UME book provider; and
each of the set of wager offers is defined in accordance with one or more of the set of wagerable UMEs and with one or more of the respective set of wager parameters associated with the one or more of the set of wagerable UMEs.

17. The method of claim 11, wherein:
the plurality of experience-adaptive UME interaction interfaces comprises at least a beginner-level UME interaction interface based on a first one or more wager experience scores, an intermediate-level UME interaction interface based on a second one or more wager experience scores, and an advanced-level UME interaction interface based on a third one or more wager experience scores.

18. The method of claim 11, wherein the determining the wager experience score comprises assigning the wager experience score to the subscriber based at least on a quantity of prior UME interactions associated with the subscriber.

19. The method of claim 11, wherein the generating the set of wager offers comprises:
generating a subscriber model based at least on a level of prior subscriber engagement with UME interactions and/or live event content; and
inputting the subscriber model and the set of wagerable UMEs to a machine-learning-based recommender engine to generate the set of wager offers for the subscriber.

* * * * *